(12) United States Patent
Gomez et al.

(10) Patent No.: US 6,765,744 B2
(45) Date of Patent: Jul. 20, 2004

(54) TRACK PITCH CONTROL USING HEAD OFFSET MEASUREMENT FOR SELF-SERVOWRITING TRACKS IN A DISC DRIVE

(76) Inventors: Kevin Arthur Gomez, 28, Choa Chu Kang St 64, #10-01 The Windemere, Singapore (SG), 689097; Qiang Bi, BLK 373, #03-192, Clementi Ave 4, Singapore (SG), 120373; Aik Chuan Lim, BLK 117, #12-73, Clementi St 13, Singapore (SG), 120117; Jimmy Tze Ming Pang, 34 Thomson Green, Singapore (SG), 574910

( * ) Notice: Subject to any disclaimer, the term of this patent is extended or adjusted under 35 U.S.C. 154(b) by 379 days.

(21) Appl. No.: 10/028,636

(22) Filed: Dec. 19, 2001

(65) Prior Publication Data

US 2002/0176199 A1 Nov. 28, 2002

Related U.S. Application Data

(60) Provisional application No. 60/280,648, filed on Mar. 30, 2001.

(51) Int. Cl.[7] .............................................. G11B 21/02
(52) U.S. Cl. ....................................................... 360/75
(58) Field of Search ............................... 360/75, 77.04, 360/78.02

(56) References Cited

U.S. PATENT DOCUMENTS

| | | | |
|---|---|---|---|
| 4,414,589 A | 11/1983 | Oliver et al. ................. 360/77 |
| 4,531,167 A | 7/1985 | Berger .......................... 360/77 |
| 4,912,576 A | 3/1990 | Janz ......................... 360/77.07 |
| 5,164,863 A | 11/1992 | Janz ............................. 360/57 |
| 5,241,430 A | 8/1993 | Janz ............................. 360/62 |
| 5,500,776 A | 3/1996 | Smith ...................... 360/77.04 |
| 5,875,064 A | 2/1999 | Chainer et al. ............... 360/75 |
| 5,907,447 A | 5/1999 | Yarmchuk et al. ............ 360/75 |
| 5,930,069 A | 7/1999 | Kim ........................ 360/78.14 |
| 5,949,603 A | 9/1999 | Brown et al. ................. 360/75 |
| 6,052,250 A | 4/2000 | Golowka et al. ......... 360/77.08 |
| 6,130,796 A | 10/2000 | Wiselogel .................... 360/75 |
| 6,650,491 B2 * | 11/2003 | Suzuki et al. ................. 360/31 |

* cited by examiner

Primary Examiner—David Hudspeth
Assistant Examiner—Mitchell Slavitt

(57) ABSTRACT

A method of, apparatus for, and means for controlling pitch of a servowritten track on a disc in a disc drive are disclosed. The disc drive has a head for traversing over a surface of the disc. The head has a read element and a write element separated by a head element offset $\Delta$. A servowriting controller operably connected to the disc drive creates a track k by writing servo information on the disc. The servowriting controller then calculates the head element offset $\Delta$ at the track k, $[\Delta_{CALC}(k)]$ and determines a skew angle $\theta$ at the track k, $[\theta(k)]$. The servowriting controller adjusts a track pitch correction factor based on the $\Delta_{CALC}(K)$ and the $\theta(k)$ such that the track pitch correction factor is utilized to servowrite a next track.

30 Claims, 12 Drawing Sheets

TRACK PITCH CONTROL USING HEAD OFFSET MEASUREMENT FOR SELF-SERVOWRITING TRACKS IN A DISC DRIVE

RELATED APPLICATIONS

This application claims priority of U.S. provisional application Serial No. 60/280,648, filed Mar. 30, 2001 and titled "TRACK-PITCH CONTROL IN SELF SERVOWRITING USING MR OFFSET."

FIELD OF THE INVENTION

This application relates generally to self-servowriting tracks in a disc drive and more particularly to controlling track pitch by using the offset measured between the read and write elements in a disc drive.

BACKGROUND OF THE INVENTION

A disc drive is a data storage device that stores digital data in magnetic form on a rotating storage medium called a disc. Modern disc drives comprise one or more rigid discs that are coated with a magnetizable medium and mounted on the hub of a spindle motor for rotation at a constant high speed. Each surface of a disc is divided into several thousand tracks that are tightly packed concentric circles similar in layout to the annual growth rings of a tree. The tracks are typically numbered starting from zero at the track located outermost the disc and increasing for tracks located closer to the center of the disc. Each track is further broken down into sectors and servo bursts. A sector is normally the smallest individually addressable unit of information stored in a disc drive and typically holds 512 bytes of information plus additional bytes for internal drive control and error detection and correction. This organization of data allows for easy access to any part of the disc. A servo burst is a particular magnetic signature on a track, which facilitates positioning of heads over tracks.

Generally, each of the multiple discs in a disc drive has associated with it two heads (one adjacent the top surface of the disc and another adjacent the bottom) for writing and reading data to or from a sector. A typical disc drive has two or three discs. This usually means that there are four or six heads in a disc drive carried by a set of actuator arms. Data is accessed by moving the heads from the inner to outer part of the disc (and vice-versa) driven by an actuator assembly. The heads that access sectors on discs are locked together on the actuator assembly. For this reason, all the heads move in and out together and are always physically located at the same track number (e.g., it is impossible to have one head at track 0 and another at track 500). Because all the heads move together, each of the tracks on all discs is known as a cylinder for reasons that the tracks are equal-sized circles stacked one on top of the other in space forming a cylinder. So, for example, if a disc drive has four discs, it would normally have eight heads (numbered 0–7), and a cylinder number 680 would be made up of a set of eight tracks, one per disc surface, at track number 680. Thus, for most purposes, there is not much difference between tracks and cylinders since a cylinder is basically a set of all tracks where all the heads are currently radially located.

Servo fields are embedded among the sectors on each track to enable the disc drive to control the position of the heads over the center of the track. Generally, the servo fields are written to the discs during the manufacture of a disc drive using a highly precise external servowriter. The servowriter typically utilizes the heads of the disc drive to write the servo fields. As the servo fields are subsequently used to define the tracks, it is important to precisely control the position of the heads as the servo fields are written to the disc surfaces. Thus, a typical servo track writer comprises an actuator positioning system which advances the position of the heads, a laser based position detector which senses the position of the heads, and control circuitry which provides the servo information to be written to the servo fields on the discs. The positioning system in an external servowriter includes a pusher pin assembly that engages the actuator assembly through an opening in the disc drive base deck. The position detector detects the position of the heads by detecting the radial position of the pusher pin assembly.

Alternatively, tracks may be written by a self-servowriter. The self-servowriter controls the position of the heads directly by applying current to the coil of the disc drive voice coil motor. Self-propagated servo track writing was first described in U.S. Pat. No. 4,414,589 (Oliver et al.). Several other patents have disclosed slight variations in the Oliver patent, but the same basic approach is used. Under the basic method, the drive's actuator arm is positioned at one of its travel range limit stops. A first reference track is written with the write element. The first reference track is then read with the read element as the head is radially displaced from the first reference track. When a distance is reached such that the read element senses a predetermined percentage of the first reference track's amplitude, a second reference track is written. The predetermined percentage is called the "reduction number".

For example, the read element senses 100% of the first reference track's amplitude when the read element is directly over the first reference track. If the reduction number is 40%, the head is radially displaced from the first reference track until the read element senses only 40% of the first reference track's amplitude. A second reference pattern is written to the disc once the 40% is sensed by the read element. The head is then displaced in the same direction until the read head senses 40% of the second reference track's amplitude. A third reference track is then written and the process continues.

The self-servowriting process ends when the actuator arm's second limit stop is reached and the entire disc surface is filled with reference tracks. The conventional servowriters then checks to see whether a target number of tracks are written on the disc. If the total number of written tracks is unacceptably higher than the target number, the disc is erased, the reduction number is lowered so that a larger displacement occurs between tracks, and the process is repeated. Likewise, if the total number of written tracks is unacceptably lower than the target number, the disc is erased, the reduction number is increased so that a smaller displacement occurs between tracks, and the self-servowriting process is repeated.

The conventional self-servowriting technique such as that shown in Oliver et al. indicates that position information of the new tracks is derived based on the signal generated in the previously written track measured by the read element. However, the total number of tracks that are to be written on a disc is often not predictable or otherwise very difficult to determine until all tracks are written on the disc. This is because the pitch of a track written on a disc cannot be determined unless there is a way to compare the pitch of the track being written with the pitch of a prewritten reference tracks. The conventional self-servowriters such as that shown in Oliver et al. typically cannot predict or determine the total number of tracks that are going to be written on a disc until all tracks are written on the disc. For this reason, the conventional self-servowriting technique such as that shown in Oliver et al. typically erases the entire disc if the average track density of the written tracks is too high or too low. A second pass of servo track writing is required by rewriting of the whole disc.

The use of an external servowriter to create a prewritten reference track increases the cost of servo track writing and further creates a possibility of disc drive contamination since the clock head and the pusher pin of the external servowriter have to be inserted inside the disc drive through an opening throughout the entire servowriting process.

The cost associated with using an external servowriter and the possibility of the disc drive contamination associated with using an external servowriter can be substantially eliminated if the pitch of a track and a total number of tracks to be written on the disc can be computed on-the-fly. Accordingly there is a need for ways to control the pitch of the track as the track is being written.

SUMMARY OF THE INVENTION

Against this backdrop the present invention has been developed. The present invention proposes a new technique for controlling pitch of a servowritten track on a disc in a disc drive. The disc drive has, inter alia, a head for traversing over a surface of the disc. In an embodiment of the present invention, the head has a read element and a write element separated by a head element offset $\Delta$. The head element offset $\Delta$ is at least one track-width wide. In other words, if the read element is aligned with a first track, the offset is at least large enough that the write element is aligned over the adjacent track.

A servowriting controller is operably connected to the disc drive. The servowriting controller creates a track k by writing servo information on the disc. Then, a skew angle of the track $\theta(k)$ is determined based on the head element offset of the track $\Delta(k)$. The $\theta(k)$ and a predetermined skew angle of the track $\theta_{PRE}(k)$ are compared. A plurality of predetermined skew angles $\theta_{PRE}$s for a plurality of tracks, including the $\theta_{PRE}(k)$, is stored in a track mapping table. The servowriting controller then generates a track pitch correction factor based on the difference between the $\theta(k)$ and the $\theta_{PRE}(k)$ such that the track pitch correction factor is utilized to servowrite a next track.

The servowriting controller determines the $\theta(k)$ based on a mathematical relationship, $\Delta(k)=S*\sin\theta(k)+\delta*\cos\theta(k)$. S is a spacing gap between the read element and the write element, and $\delta$ is a base head element offset. This mathematical relationship can be used to determine the skew angle of a track on the disc based on offset $\Delta(k)$. To obtain the $\Delta(k)$, the head writes a temporary track on the disc while the read element of the head is following the track k. The head then moves over to the temporary track, and the servowriting controller determines a new head position. The head element offset $\Delta(k)$ is determined by subtracting the head position at track k and the new head position over the temporary track.

The servowriting controller determines the S and the $\delta$ during a calibration stage prior to servowriting tracks on the disc. Generally, the $\delta$ and the S are determined by using the same above mathematical relationship based on a $\theta(ID)$, a $\theta(OD)$, a $\Delta(ID)$, and a $\Delta(OD)$. The $\Delta(ID)$ is a head element offset $\Delta$ calculated when the head is positioned at an inner diameter (ID) radial position, preferably when the actuator arm is positioned at the ID limit stop. Likewise, the $\Delta(OD)$ is a head element offset $\Delta$ calculated when the head is positioned at an outer diameter (OD) radial position on the disc, preferably when the actuator arm is positioned at the ID limit stop. The $\theta(ID)$ is a predetermined skew angle when the head is positioned at an ID limit stop, and the $\theta(OD)$ is a predetermined skew angle when the head is position at an OD limit stop.

The servowriting controller determines whether the difference between the $\theta(k)$ and the $\theta_{PRE}(k)$ is within a predetermined tolerance. A desired track density is maintained on the disc if the difference between the $\theta(k)$ and the $\theta_{PRE}(k)$ is within a predetermined tolerance.

If the difference between the $\theta(k)$ and the $\theta_{PRE}(k)$ is not within the predetermined tolerance, the servowriting controller adjusts the track pitch control factor. The servowriting controller rewrites a previously servowritten track incorporating the adjusted track pitch control factor such that the difference between the $\theta(k)$ and the $\theta_{PRE}(k)$ is within the predetermined tolerance.

If the difference between the $\theta(k)$ and the $\theta_{PRE}(k)$ is within the predetermined tolerance such that a desired track density is maintain on the disc, the servowriting controller adjusts the track pitch control factor for writing servo information on a new track (k+1). The servowriting controller then writes the new track (k+1) adjacent the track k with servo information based on the adjusted track pitch control factor such that the difference between the skew angle of the new track $\theta(k+1)$ and the predetermined skew angle of the new track $\theta_{PRE}(k+1)$ is within the predetermined tolerance.

In an alternate embodiment of the present invention, the $\theta(k)$, is interpolated based on at least two predetermined skew angles, $\theta_{PRE}$s. A plurality of $\theta_{PRE}$s for a plurality of tracks is stored in a track mapping table. A desired head element offset $\Delta_{DES}$ for the track k, $[\Delta_{DES}(k)]$, is determined based on a mathematical relationship, $\Delta_{DES}(k)=S*\sin\theta(k)+\delta*\cos\theta(k)$. S is a spacing gap between the read element and the write element and $\delta$ is a base head element offset.

The servowriting controller determines whether a difference between the $\Delta_{CALC}(k)$ and the $\Delta_{DES}(k)$ is within a predetermined tolerance. A desired track density is maintained on the disc if the difference between the $\Delta_{CALC}(k)$ and the $\Delta_{DES}(k)$ is within the predetermined tolerance.

The servowriting controller adjusts the track pitch control factor for re-servowriting a previously servowritten track if the difference between the $\Delta_{CALC}(k)$ and the $\Delta_{DES}(k)$ is not within the predetermined tolerance, and re-servowrites the track k utilizing an adjusted track pitch control factor such that the difference between the $\Delta_{CALC}(k)$ and the $\Delta_{DES}(k)$ is within the predetermined tolerance. Alternatively, the servowriting controller adjusts the track pitch control factor for servowriting a new track (k+1) if the difference between the $\Delta_{CALC}(k)$ and the $\Delta_{DES}(k)$ is within the predetermined tolerance such that a desired track density is maintain on the disc, and servowrites the new track (k+1), preferably adjacent the track k, utilizing the adjusted track pitch control factor such that the difference between the calculated head element offset $\Delta_{CALC}$ of the new track (k+1), $[\Delta_{CALC}(k+1)]$, and the desired head element offset $\Delta_{DES}$ of the new track (k+1), $[\Delta_{DES}(k+1)]$, is within the predetermined tolerance.

These and various other features as well as advantages which characterize the present invention will be apparent from a reading of the following detailed description and a review of the associated drawings.

DETAILED DESCRIPTION

Figure 1:
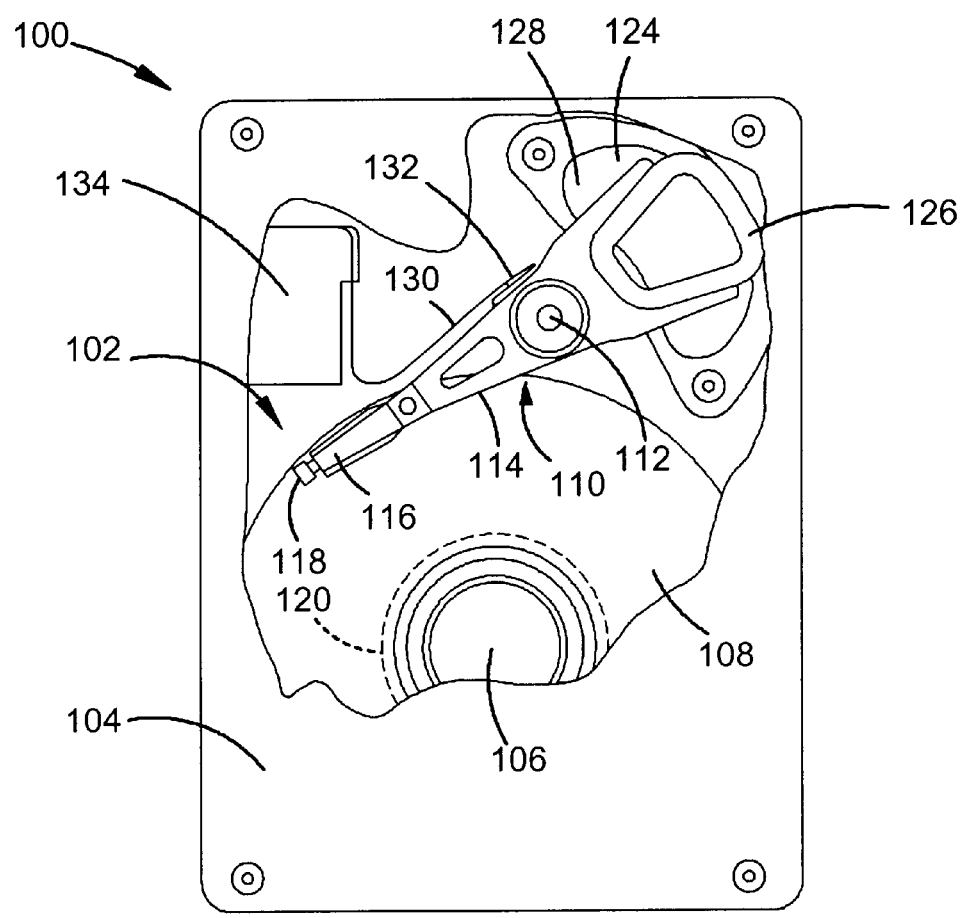
FIG. 1 is a plan view of a disc drive incorporating an embodiment of the present invention showing the primary internal components of the disc drive.

A disc drive 100 constructed in accordance with an alternate embodiment of the present invention is shown in FIG. 1. The disc drive 100 includes a base 102 to which various components of the disc drive 100 are mounted. A top cover 104, shown partially cut away, cooperates with the base 102 to form an internal, sealed environment for the disc drive in a conventional manner. The components include a spindle motor 106, which rotates one or more discs 108 at a constant high speed. Information is written to and read from tracks on the discs 108 through the use of an actuator assembly 110, which rotates during a seek Operation about a bearing shaft assembly 112 positioned adjacent the discs 108. The actuator assembly 110 includes a plurality of actuator arms 114 which extend towards the discs 108, with one or more flexures 116 extending from each of the actuator arms 114. Mounted at the distal end of each of the flexures 116 is a head 118, which includes an air bearing slider, enabling the head 118 to fly in close proximity above the corresponding surface of the associated disc 108.

During a seek Operation, the track position of the heads 118 is controlled through the use of a voice coil motor (VCM) 124, which typically includes a coil 126 attached to the actuator assembly 110, as well as one or more permanent magnets 128 which establish a magnetic field in which the coil 126 is immersed. The controlled application of current to the coil 126 causes magnetic interaction between the permanent magnets 128 and the coil 126 so that the coil 126 moves in accordance with the well-known Lorentz relationship. As the coil 126 moves, the actuator assembly 110 pivots about the bearing shaft assembly 112, and the heads 118 are caused to move across the surfaces of the discs 108.

The spindle motor 106 is typically de-energized when the disc drive 100 is not in use for extended periods of time. The heads 118 typically are moved over park zones 120 near the inner diameter of the discs 108 when the drive motor is de-energized. The heads 118 are secured over the park zones 120 through the use of an actuator latch arrangement, which prevents inadvertent rotation of the actuator assembly 110 when the heads are parked. In addition, inner diameter (ID) and outer diameter (OD) limit stops (not shown) are mounted in the disc drive 100 to protect the heads 118 from deviating away from the operating surfaces of the discs 108.

A flex assembly 130 provides the requisite electrical connection paths for the actuator assembly 110 while allowing pivotal movement of the actuator assembly 110 during Operation. The flex assembly includes a printed circuit board 132 to which head wires (not shown) are connected; the head wires being routed along the actuator arms 114 and the flexures 116 to the heads 118. The printed circuit board 132 typically includes circuitry for controlling the write currents applied to the heads 118 during a write Operation and a preamplifier for amplifying read signals generated by the heads 118 during a read Operation. The flex assembly terminates at a flex bracket 134 for communication through the base 102 to a disc drive printed circuit board (not shown) mounted to the bottom side of the disc drive 100.

Figure 2:
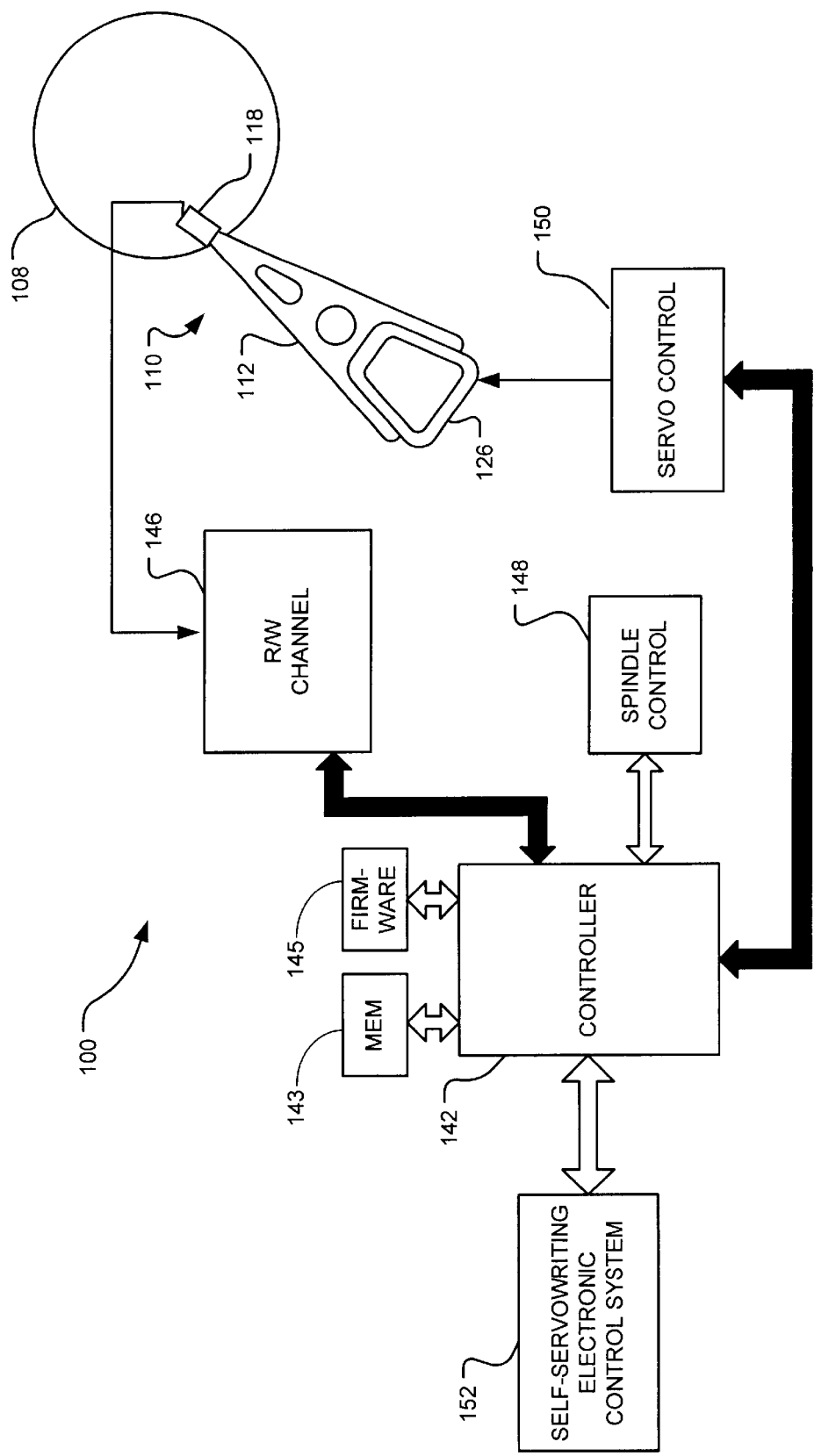
FIG. 2 is a simplified block diagram of a disc drive and its connection to a self-servowriting controller including a servo system with which the present invention is particularly useful.

Referring now to FIG. 2, shown therein is a functional block diagram of the disc drive 100 of FIG. 1, generally showing the main functional circuits that are resident on the disc drive printed circuit board and used to control the operation of the disc drive 100. The controller 142 generally provides top level communication and control for the disc drive 100 in conjunction with programming for the controller 142 stored in a controller memory (MEM) 143 and/or a firmware 145. The memory 143 can include random access memory (RAM), read only memory (ROM), and other sources of resident memory for the controller 142.

The discs 108 are rotated at a constant high speed by a spindle control circuit 148, which typically electrically commutates the spindle motor 106 (FIG. 1) through the use of back electromotive force (BEMF) sensing. During a seek operation, the track position of the heads 118 is controlled through the application of current to the coil 126 of the actuator assembly 110. A servo control circuit 150 provides such control. During a seek operation, the microprocessor controller 142 receives information regarding the velocity and acceleration of the head 118 and uses that information in conjunction with a model, stored in memory 143, to communicate with the servo control circuit 150, which will apply a controlled amount of current to the voice coil motor 126, thereby causing the actuator assembly 110 to be pivoted.

The disc drive 100 is shown in FIG. 2 to be operably connectable to a self-servowriting electronic control system 152. Control communication paths are provided between the self-servowriting electronic control system 152 and a disc drive controller 142. The self-servowriting electronic control system 152 contains necessary electronic hardware components and software modules that are needed for accurate control of the actuator and for self-propagated servo track writing. The circuitry and the associated software modules for the self-servowriting electronic control system 152 could be external to the disc drive and connectable to the controller of the disc drive. Alternatively, the circuitry could be integrated into or a part of the disc drive circuitry, and the software modules could be contained in the memory 143 or the firmware 145 of the disc drive 100.

Figure 3:
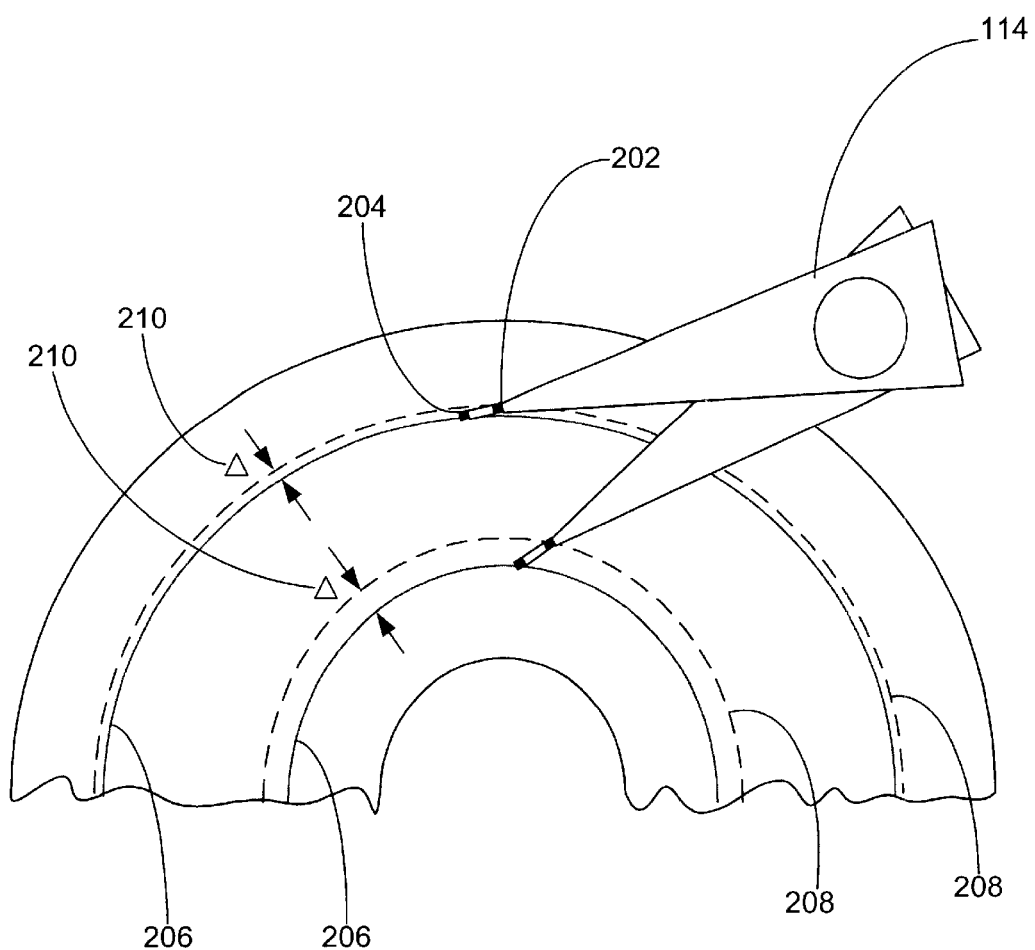
FIG. 3 is an illustration of an offset between a read element and a write element on a head, which mounted at the distal end of an actuator arm, as the actuator arm radially traverses over the disc.

FIG. 3 shows a separate read element 202 and a write element 204 mounted on the head 118. Note that the elements in FIG. 3 are not drawn to scale, and they are drawn for an illustration purpose only. In particular, the separation between and the sizes of the read and write elements 202, 204 are grossly exaggerated. The head 118 is mounted at the distal end of the rotary actuator arm 114, which pivots about the bearing shaft assembly 112. The read and write elements 202, 204 are positioned on the head 118, but the distance between each head element, 202 or 204, and the center of the bearing shaft assembly 112 about which the actuator arm 114 is pivoted is not a same distance. An offset exists between the read and write elements 202, 204 along the longitudinal axis of the actuator assembly 114. For this reason, the angle between a tangential line to a track and the line drawn along the longitudinal axis of the actuator arm 114 changes as the head 118 moves from the ID to the OD, and vice versa. As a result, each of the head elements 202, 204 moves on a different disc radius as shown by paths 206 and 208 in FIG. 2 (i.e., the paths of the read element 202 on the disc 108 are depicted by 208, and the paths of the write element 204 are depicted by 208). The radial distance measured between the read element path 206 and the write element path 208 is referred to as a head element offset $\Delta$ (210). The head element offset $\Delta$ (210) changes as the head 118 moves from ID to OD, and vice versa.

According to an embodiment of the present invention, the read and write elements 202, 204 are assembled on the head 118 in such a way that the head element offset $\Delta$ (210) between the read and write elements 202, 204 is sufficiently wide to cover at least one track width. In other words, if the read element is aligned with a first track, the head element offset $\Delta$ (210) is at least large enough that the write is aligned over the adjacent track. The read and write element paths 206, 208 do not therefore overlap for this reason. According to the ECHO servowriting technique, the read and write elements 202, 204 are offset from each other by at least one track width such that the offset is large enough that the write element 204 is aligned over the adjacent track when the read element 202 is aligned with a first track. However, other self-servowriting techniques, such as that disclosed in Oliver et al. (briefly described in the Background of the Invention), may be utilized in lieu of the ECHO servowriting technique, and obtain the same results and benefits of the present invention.

Figure 4:
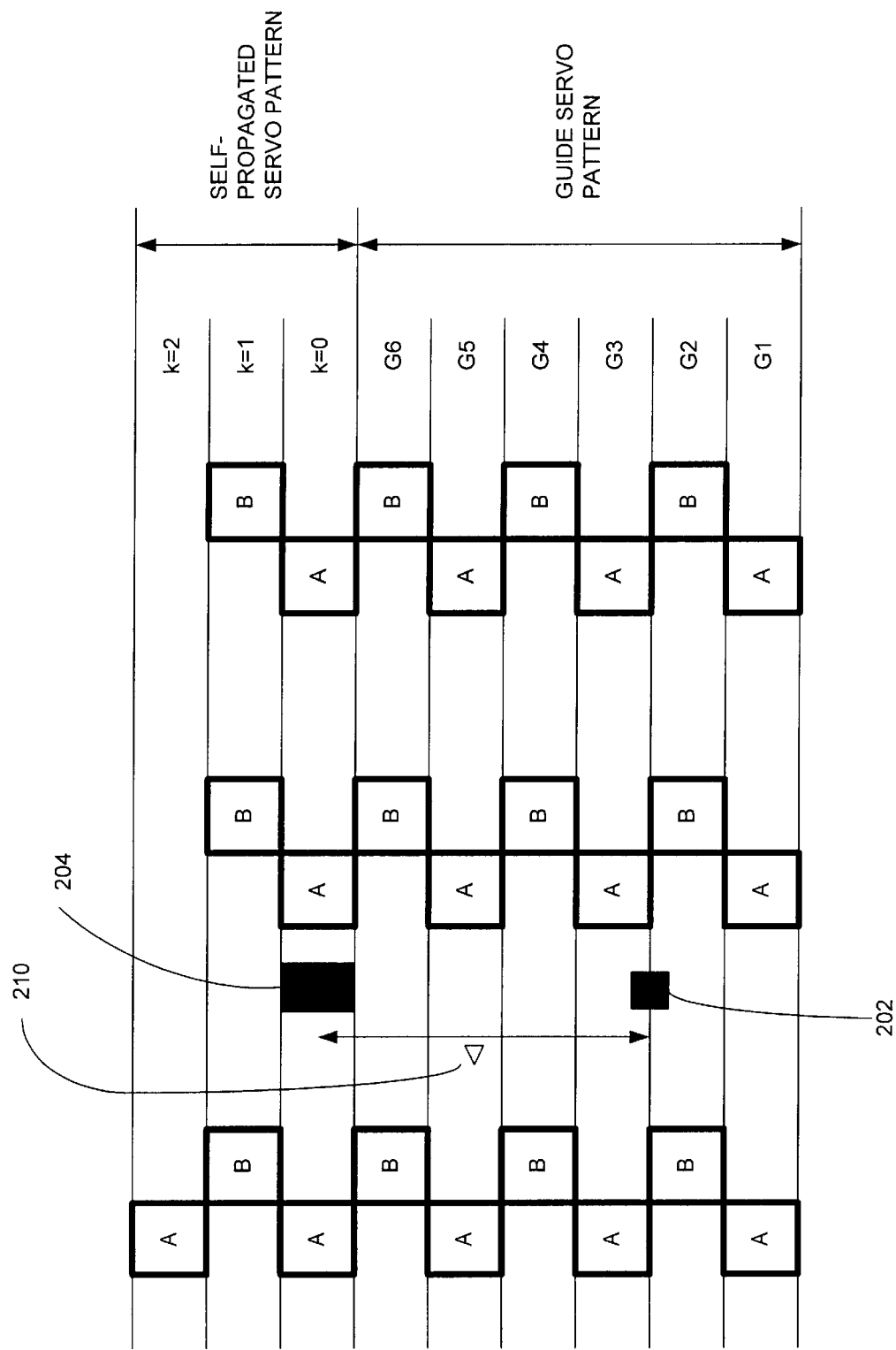
FIG. 4 illustrates the offset between the read element and the write element as the head traverses the servo guide pattern in accordance with an embodiment of the present invention.

The ECHO servowriting technique is generally described with respect to FIG. 4. The ECHO servowriting technique first writes a series of guide tracks (tracks G1–G6 shown in FIG. 4). The guide tracks are a number of contiguous servo tracks. The guide tracks can be located at any radial location on the disc 108 surface. Typically, the radial placement of the guide tracks is determined based on the placement arrangement of the read and write elements 202, 204 on the head 118. For example, the guide tracks are preferably written at near the disc ID if the placement position of the read element 202 on the head 118 is nearer to the disc ID than the placement position of the write element 204 on the head 118. Conversely, the guide tracks are preferably written at near the disc OD if the placement position of the read element 202 on the head 118 is nearer to the disc OD than the placement position of the write element 204 on the head 118. An embodiment of the present invention assumes that the read element 202 is nearer to the disc OD than the write element 204, and therefore the guide tracks are written at near the OD (shown as tracks G1–G6 in FIG. 4). New tracks are then self-propagated from the OD to the ID.

One way to lay guide tracks on the disc 108 is to write the servo burst patterns in each guide track using an external servowriter. The servo burst patterns written on the guide tracks are also referred to as guide servo burst patterns. For simplicity reasons, FIG. 4 illustrates the propagation of AB servo patterns on the servo tracks; however, other types of servo burst patterns (i.e., ABCD quadrature servo burst patterns, phase pattern, etc.) may be utilized instead.

The guide tracks G1–G6 are used as a guide to self-servowrite (or propagate) the next contiguously adjacent track k=0, 1, 2, etc. According to the ECHO servowriting technique, new tracks are self-servowritten by the write element 204 while the read element 202 is following the servo burst patterns on one of the previously written tracks (i.e., the guide tracks). Thus, the head 118 follows the shape of one of the previously written tracks. The shape accuracy of the guide servo patterns written on each guide track therefore directly impacts the shape accuracy of the subsequently self-servowritten tracks (i.e., tracks k=0, 1, 2, etc. in FIG. 4). This is one of the reasons for using an external servowriter to write guide servo burst patterns on the guide tracks in an embodiment of the present invention; however, the guide tracks can also be self-servowritten, albeit there may be a need to verify shape accuracy of the written guide tracks.

It may be desirable to correct any track shape irregularities appearing on the guide tracks. One possible approach to substantially eliminate the track shape irregularities is to apply Zero Acceleration Path (ZAP) technique to these guide tracks. The ZAP technique substantially eliminates written-in repeatable runout track shape errors such that the shape of each ZAP corrected tracks becomes nearly perfectly circular. Therefore, no serious track shape errors would be introduced to subsequently self-servowritten tracks if the guide tracks are ZAP corrected. The basic idea of the ZAP technique is to add appropriate correction factors to the measured head position at each servo sector. The correction factors cancel written-in errors, thereby improving the shape of the modified track.

The guide tracks written by an external servowriter should be at least as many tracks as the head element offset $\Delta$ (210). Typically, about 50 to 100 guide tracks (out of more than 60,000 tracks on a disc) are written by an external servowriter. These 50 to 100 guide tracks can also be used for MR head offset calibration, timing calibration, DC spacing calibration, PES linearization, and servo parameters calibration, etc. In an embodiment of the present invention, the maximum head element offset $\Delta$ (210) shown in FIG. 4 equals 4.5 track widths, and therefore at least five guide tracks are required to be written by an external servowriter.

After writing all guide tracks, the disc drive is removed from the external servowriter and is connected to the self-servowriting electronic control system 152. The self-servowriting electronic control system 152 contains necessary electronic hardware components and software modules that are needed for accurate servo control of the actuator and for self-propagated servo track writing.

The self-servowriting electronic control system 152 basically replicates the guide servo burst patterns over the entire disc surface by utilizing the head element offset $\Delta$ (210). The self-servowriting electronic control system 152 controls the actuator arm 114 and can therefore position the read element 202 over the guide track servo patterns (i.e., the tracks G1–G6 in FIG. 4). As described above, the ECHO self-servowriting technique requires that the head 118 be assembled with a minimum head element offset $\Delta$ (210) that is wide enough to cover at least one servo track width at any point on the disc 118 without overlapping the read and write element paths 206, 208. As shown in FIG. 4, the maximum head element offset $\Delta$ (210) in an embodiment of the present invention is 4.5 track widths. Therefore, if the read element 202 is positioned at the boundary of the tracks 2 and 3 and follow the boundary, the write element 204 would be positioned over the track k=0 and able to write servo patterns on that track. After writing A servo bursts on the track k=0, the read element 202 positions itself over the boundary of tracks G3 and G4 so that the write element 204 would be in a correct position to write B servo bursts on the track k=1. When the read element 202 reaches the end of the guide servo burst patterns (i.e., the track G6), the read element 202 follows the self-servowritten track that is contiguously adjacent the last guide track (i.e., the track k=0). In this manner, the self-servowriting electronic system self-propagates tracks without help from an external servowriter, and the self-servowriting process continues until the desired number of servo tracks are written.

Figure 5:
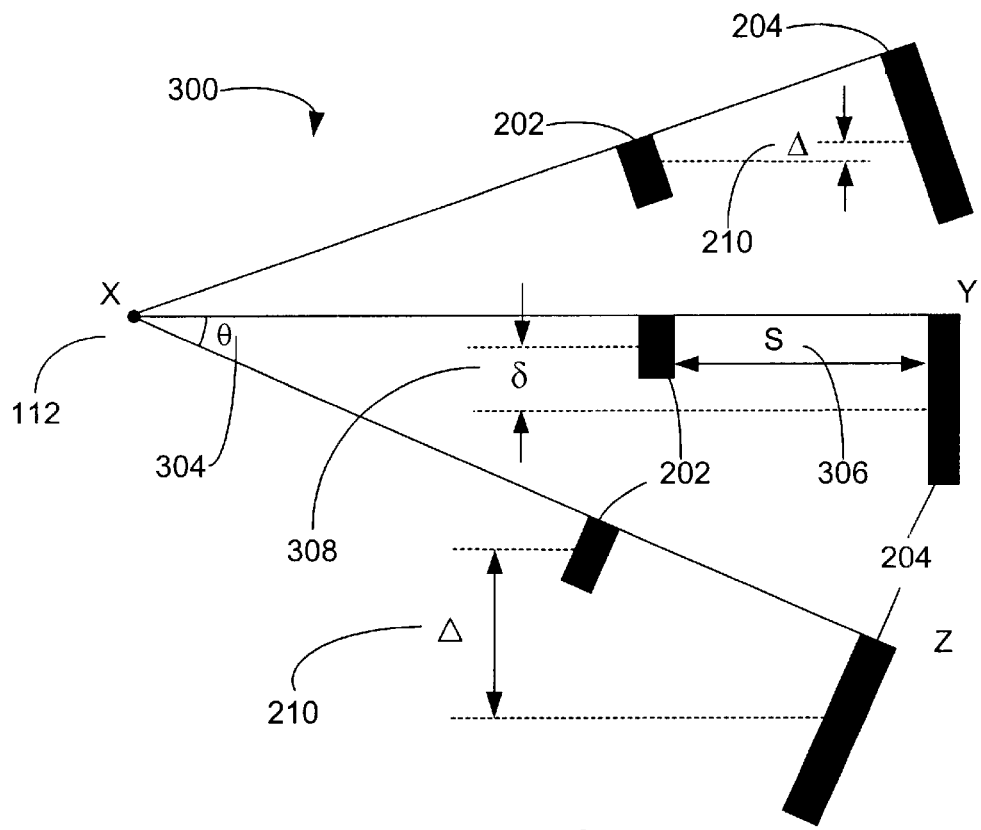
FIGS. 5 and 6 illustrates the spatial arrangement of the read and write elements on the head to show the head element offset Δ.
Figure 6:
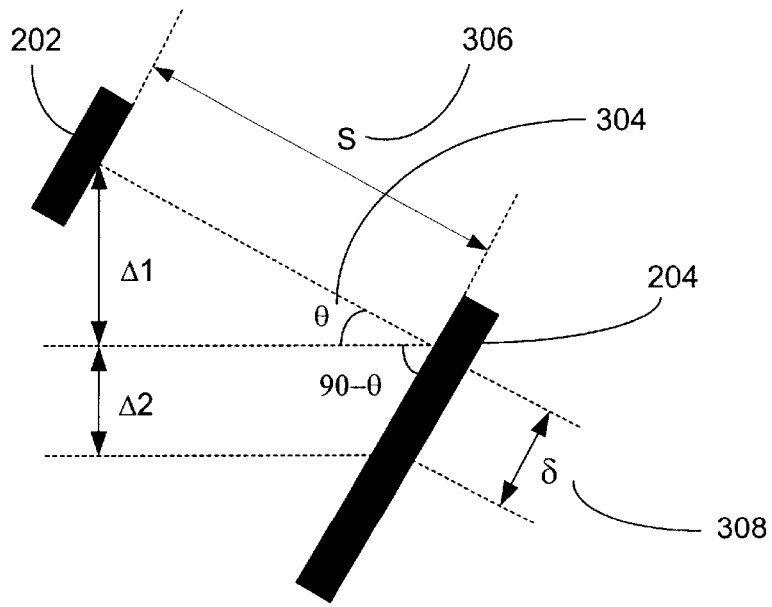

FIGS. 5–6 are general representations of the read and write elements 202, 204 drawn spatially with respect to each other and with respect to the center of the bearing shaft assembly X (112) to illustrate the mathematical relationship between a head element offset Δ (210) and a skew angle θ (304). Note that the size and the position of the read and write elements 202, 204 with respect to each other and with respect to the center of the bearing shaft assembly X (112) in FIGS. 5–6 are grossly exaggerated and not drawn to scale. Further, neither the angles nor the dimensions shown by a set of symbols (such as θ, S, δ, Δ, Δ1, Δ2) in FIGS. 5–6 are drawn to scale. They are rather drawn to generally show how theses angles and dimensions are measured from what particular reference points, lines, or angles and also to generally illustrate the proportional magnitudes of these angles and dimensions relative to each other.

The skew angle θ (304) is measured between a predetermined base line XY (FIG. 5) and the longitudinal axis XZ (FIG. 5) of the actuator arm 114 about the center of the bearing shaft assembly X (112). Typically, the predetermined base line XY is located where the head 118 of the longitudinal axis of the actuator arm 114 is at the point of tangency with a predetermined track (e.g., a track drawn at near the OD limit stop) that is theoretically a perfect circle on the disc 108. However, the location of the predetermined base line XY is a matter of design choice, and the skew angle θ (304) is measured from the predetermined base line XY once the predetermined base line XY is determined.

The head element offset Δ (210) is an offset between the lengthwise midpoint of the read element 202 and the lengthwise midpoint of the write element 204 measured along a line that is perpendicular to the predetermined baseline XY. It can be generally seen in FIG. 5 that the length of the head element offset Δ (210) varies as the skew angle θ (304) changes. A special case for the head element offset Δ (210) is made when the head element offset Δ (210) is measured when the skew angle θ (304) is 0. This special case is depicted in FIGS. 5–6 as a base head element offset δ (308). That is, a base head element offset δ (308) is measured between the lengthwise midpoint of the read element 202 and the lengthwise midpoint of the write element 204 along a line that is perpendicular to the predetermined baseline XY when the longitudinal axis XZ of the actuator arm 114 coincides with the predetermined baseline XY. The spacing gap S (306) is a distance measured between the read and write elements 202, 204 along a line parallel to the longitudinal axis of the actuator arm 114.

The head element offset Δ (210) can be mathematically shown by the following equation:

$$\Delta = \Delta1 + \Delta2 \qquad \text{[Equation 1]}.$$

Further, it can be shown that:

$$\Delta1 = S*\sin\theta \qquad \text{[Equation 2], and}$$

$$\Delta2 = \delta*\cos\theta \qquad \text{[Equation 3], thus}$$

$$\Delta = S*\sin\theta + \delta*\cos\theta \qquad \text{[Equation 4]}.$$

Equation 4 indicates that there is a one-to-one mapping relationship between the head element offset Δ (210) and the skew angle θ (304) since the base head element offset δ (308) and the spacing gap S (306) are constants. Equation 4 also indicates that the relationship between the skew angle θ (304) and the head element offset Δ (210) approximates closely to a linear relationship. In an embodiment of the present invention, the head element offset Δ (210) measured by the self-servowriting electronic control system 152 and the skew angle θ (304) is determined based on the measured head element offset Δ (210). To measure the head element offset Δ (210), the self-servowriting electronic control system 152 controls the actuator arm 114 so that the read element 202 follows the servo burst pattern on a first track with a known head position x1. The write element 204 then writes a temporary servo burst patterns on the disc 108 while the read element 202 is following the first track. The self-servowriting electronic control system 152 then moves the read element toward the newly written temporary servo burst patterns until the signal read by the read element 202 is maximum (or minimum depending on the design). This means that the read element 202 is substantially at the center of the new track written with the temporary servo bursts. The self-servowriting electronic control system 152 then determines the new head position, and if the new head position is designated as x2, the head element offset Δ (210) is calculated as Δ=x1−x2.

There are several methods of determining whether or not a read element 202 is over the center of a track (i.e., the head position x2) written with temporary servo bursts, and these methods are well known to those familiar with the disc drive design. For this reason, these methods are not discussed in detail here, but the four basic methods are briefly described in the following:

(1) VARIABLE GAIN AMPLIFICATION (VGA) METHOD: A VGA signal is inversely proportional to the signal strength read by the read element 202 (e.g., the VGA signal strength is large if the strength of the signal read by the read element 202 is small, and vice versa). Thus, the read element 202 is positioned at the center of the radial width of a track when the VGA signal strength is minimum since the signal strength of the servo bursts read by the read element 202 is maximum at the center of the radial width of the track (i.e., the head position x2).

(2) BURST AMPLITUDE METHOD: The burst amplitude method monitors the maximum signal strength of the servo bursts (instead of the minimum VGA signal strength) of the track.

(3) SPECTRUM METHOD: In the above described VGA and burst amplitude methods, there could be a possibility that the read data may be contaminated with noise introduced at frequencies outside the spectrum band of the VGA signal or the servo burst signal since the VGA signal and the servo burst signal are time domain signals. In order to separate out the noise, the spectrum method utilizes a band-pass filter or a spectrum analyzer to avoid the frequency range outside the spectrum band of the servo burst signal. A track center is determined when peak signal strength is detected from the band of frequencies that corresponds to the VGA signal or the servo burst signal ready by the read element 202.

(4) BIT ERROR RATE (BER) METHOD: A BER method monitors the Bit Error Rate as the head is following a track, and determines that the head (118) is over the center of the track when the Bit Error Rate reaches the minimum value.

Any or a combination of two or more of the four methods may be used to determine the head element offset Δ (210). For example, the burst amplitude method alone may be utilized to determine the head position x2 by monitoring the servo burst signal strength and positioning the read element 210 closely to the center of the newly written track. The head element offset Δ (210) is then determined (i.e., Δ=x1−x2). Alternatively, the VGA method may be first utilized to position the read element 202 over the center of a newly written track, and the BER method may be subsequently utilized to further refine the position of the head 118 over the track center. The head element offset Δ (210) may then be determined.

Figure 7:
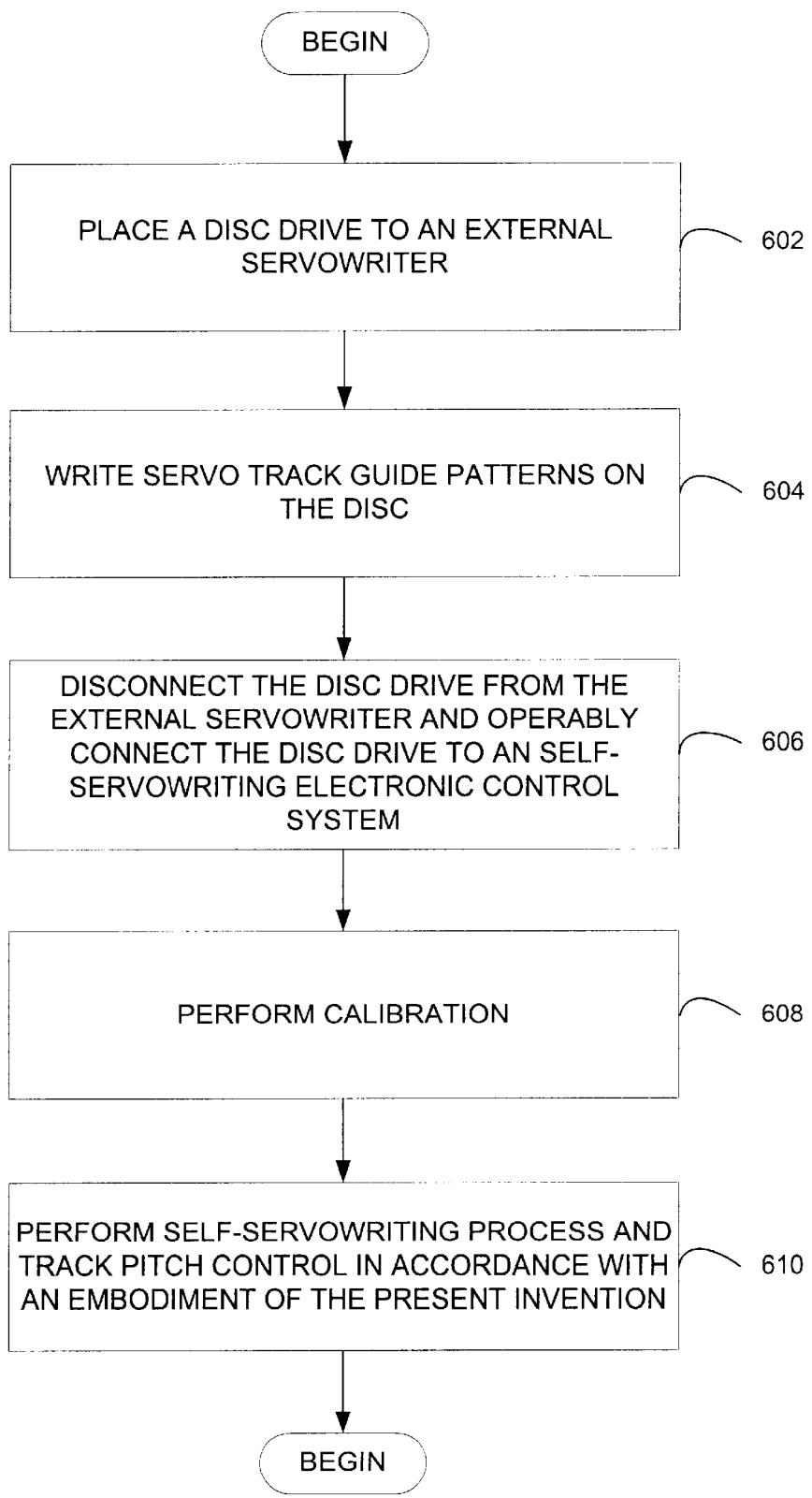
FIG. 7 is a flowchart of a general self-servowriting process in accordance with an embodiment of the present invention that controls the track pitch using the head element offset Δ.

FIG. 7 is a flowchart of a general self-servowriting process in accordance with an embodiment of the present invention that controls the track pitch using the head element offset Δ. The self-servowriting process begins in Operation 602 by placing a disc drive 100 in an external servowriter (not shown). The external servowriter is a large piece of external equipment that writes servo tracks on the disc 108. The servowriter uses a very accurate lead screw and laser displacement measurement feedback device to precisely align the write element 202. A head/arm positioner of the servowriter is attached to the actuator arm 114 in the disc drive 100 and positions the write element 202 over the disc 108 where the desired servo track is to written. The servowriter writes a servo track once the write element 202 is correctly aligned. The head/arm positioner then moves the write element 202 a predetermined radial distance to the next desired servo track location. The head/arm positioner, therefore, controls the track placement and track-to-track spacing.

Operation 604 assumes control from Operation 602 once the disc drive 100 is placed in the external servowriter. Operation 604 preferably writes a set of guide servo tracks at the disc ID and OD; however, these guide servo tracks may be located at any radial location on the disc 108. The width of the servo guide patterns produced by the written servo tracks at the ID and the OD should exceed the maximum value of the head element offset Δ (210). For example, now referring to FIG. 4, the external servowriter in an embodiment of the present invention needs to write at least five guide tracks since the maximum head element offset Δ (202) is 4.5 track widths.

Now referring back to FIG. 7, control is passed to Operation 606 when Operation 604 is completed. The disc drive 100 is disconnected from the external servowriter (not shown) and operably connected to the self-servowriting electronic control system 152. Operation 608 assumes control once the disc drive 100 is connected to the self-servowriting electronic control system 152. The calibration completed by Operation 608 includes, inter alia, determining the base head element offset δ (308) and the spacing gap S (306), which are needed to solve Equation 4.

Figure 8:
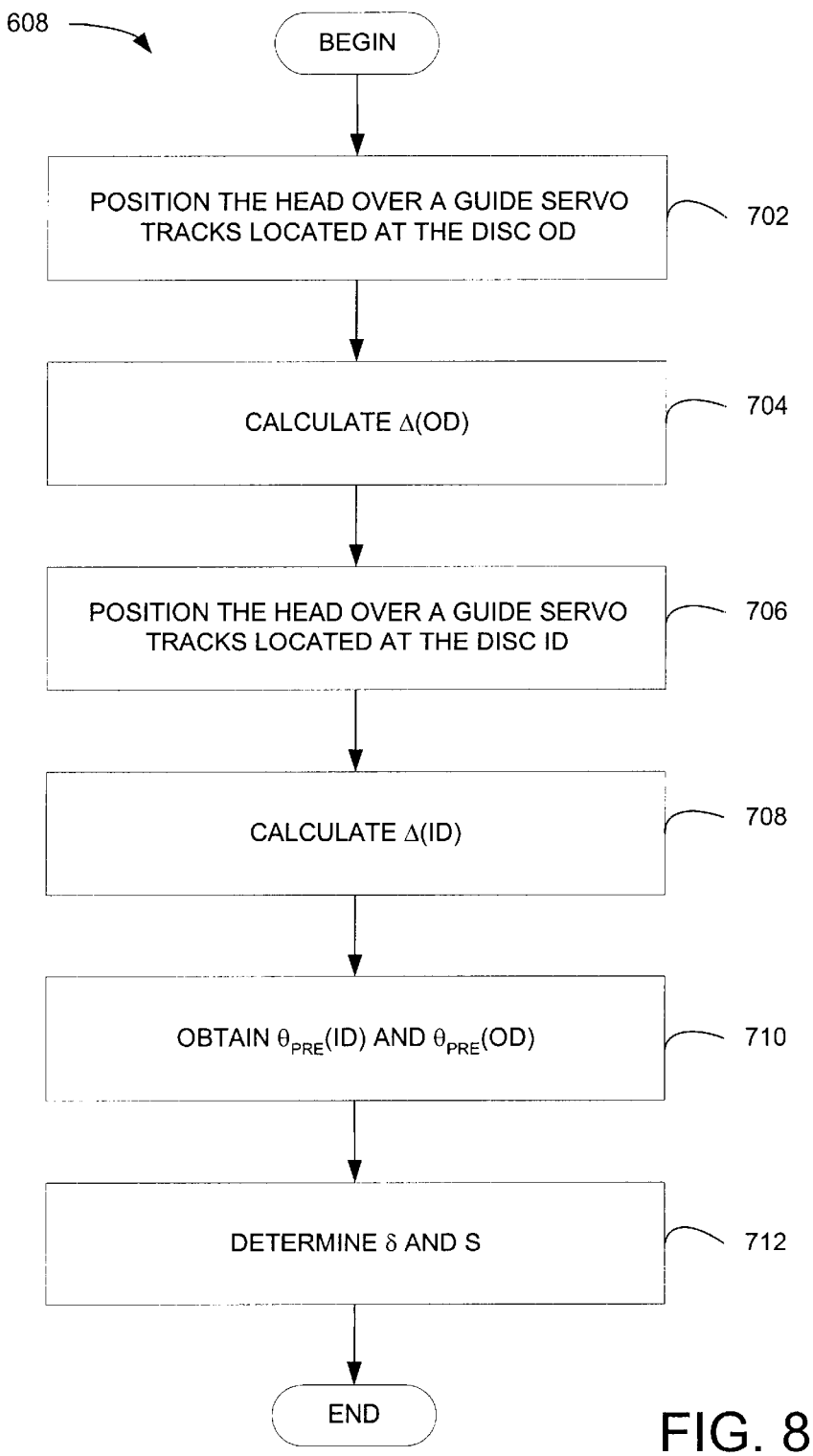
FIG. 8 is a flowchart generally showing operations for determining a base head element offset δ and the spacing gap S between the read and write elements in accordance with an embodiment of the present invention.

FIG. 8 is a calibration flowchart showing in more detail Operation 608 for determining the base head element offset δ (308) and the spacing gap S (306). The control begins in Operation 702. The self-servowriting electronic control system 152 positions the head 118 over a guide servo track located at the disc OD (e.g., the guide servo track G6 in FIG. 4). Control transfers to 704 once the read element 202 follows the guide servo track. The head element offset at the disc OD Δ(OD) is then measured, and a method of measuring the head element offset Δ (210) is generally described above. To illustrate again, however, the write element 204 writes a temporary servo track on the disc 108 while track following the guide track G6 (shown in FIG. 4). The head position over the guide track G6 is measured as x(G6). The read element then moves over to the newly written temporary servo track, and measures the head position when the maximum servo burst signal strength is read. If the measured head position over the newly written servo track is x(temp), then the head element offset at OD, Δ(OD), can be calculated as Δ(OD)=x(G6)−x(temp).

Operation 706 assumes control once the head element offset at OD, Δ(OD), is calculated Operation 704. The self-servowriting electronic control system 152 positions the head 118 over a guide servo track located at the disc ID (not shown in FIG. 4). Control transfers to 708 once the read element 202 follows the guide servo track. The head element offset at the disc ID Δ(ID) is then measured as described above.

Generally, the two constant values, S (306) and δ (308), of Equation 4 are determined based on the Δ(ID), Δ(OD), θ(ID), and θ(OD). Δ(ID) and Δ(OD) are calculated as described above with respect to Operations 702–708. Further, in general, the guide servo tracks are written at the disc ID and OD when the actuator arm 114 is positioned at the respective limit stop. Therefore, the guide tracks at the disc ID and OD typically define two boundaries on the disc 108 between which boundaries all servo tracks are to be self-servowritten by using the self-servowriting electronic control system 152. Therefore, the skew angle at the disc ID, θ(ID), and the skew angle at the disc OD, θ(OD), define the two angular boundaries, between which angular boundaries the actuator arm 114 can rotate about the center of the bearing shaft assembly X (112 in FIG. 5). Typically, the skew angles at the disc ID and OD are predetermined during the design of the disc drive 100, and these two predetermined skew angles are respectively denoted here as $\theta_{PRE}$(ID) and $\theta_{PRE}$(OD). These predetermined values may be stored in a disc drive memory (143) or could be supplied by a person to the self-servowriting electronic control system 152.

Operation 710 assumes control once Δ(ID) and Δ(OD) are determined in Operations 702–708 and obtains the predetermined skew angles at the disc ID and OD, $\theta_{PRE}$(ID) and $\theta_{PRE}$(OD). The control finally transfers to Operation 712 to determine the base head element offset δ (308) and the spacing gap S (306) once the head element offsets at both ID and OD, Δ(ID) and Δ(OD), are measured and the predetermined skew angles, $\theta_{PRE}$(ID) and $\theta_{PRE}$(ID), are obtained. These four values, the measured Δ(ID) and Δ(OD) and the predetermined $\theta_{PRE}$(ID) and $\theta_{PRE}$(OD) are applied to the Equation 4 in Operation 712 to determine δ (308) and S (306) as shown in Equations 5 and 6:

$$\Delta(ID) = S^* \sin \theta_{PRE}(ID) + \delta^* \cos \theta_{PRE}(ID) \qquad [\text{Equation 5}];$$

$$\Delta(OD) = S^* \sin \theta_{PRE}(OD) + \delta^* \cos \theta_{PRE}(OD) \qquad [\text{Equation 6}].$$

The two unknown values, δ (308) and S (306), can be easily solved from the Equations 5 and 6 above since the Equations 5 and 6 represent two equations with two unknown values. $\theta_{PRE}$(ID) and $\theta_{PRE}$(OD) are the predetermined skew angles at the disc ID and OD as described above. The actual skew angles at the disc ID and OD, $\theta_{ACT}$(ID) and $\theta_{ACT}$(OD), may vary from one disc drive to another disc drive due to disc drive component tolerances. Typically, the $\theta_{ACT}(ID)$ or the $\theta_{ACT}(OD)$ varies 2–5 degrees from the predetermined $\theta_{PRE}$. This variation is generally due to component dimension errors (i.e., mainly from a suspension assembly (not shown) in the disc drive 100) that are inevitably introduced when the disc drive components are manufactured and assembled into a disc drive. This error is known as a common-mode error, $\epsilon$, (i.e., $\epsilon = \theta_{PRE} - \theta_{ACT}$).

One characteristic of the common mode error, $\epsilon$, is that if the skew angle at the disc ID, $\theta(ID)$, is deviated from the predetermined value, $\theta_{PRE}(ID)$, by $\epsilon$ degrees, the skew angle at the disc OD, $\theta(OD)$, is also deviated from the predetermined value $\theta_{PRE}(OD)$ by the same $\epsilon$ degrees in the same direction. For this reason, the common mode error, $\epsilon$, does not contribute error to $\theta(m)-\theta(OD)$ when a skew angle at any radial position between the disc ID and OD, $\theta(m)$ where $\theta(ID) < \theta(m) < \theta(OD)$, is computed by plugging $\delta$ (308) and S (306) that are computed based on $\theta_{PRE}(ID)$ and $\theta_{PRE}(OD)$ into Equation 4.

This characteristic of the common-mode error, $\epsilon$, is mathematically proven below. After measuring the head element offsets at the disc ID and OD, $\Delta(ID)$ and $\Delta(OD)$, the base head element offset $\delta'$ (308) and the spacing gap S' (306) are calculated by using the predetermined $\theta_{PRE}(ID)$ and $\theta_{PRE}(OD)$ as shown by the following Equations 7 and 8.

$$\Delta(ID) = \delta'^{*}\cos\theta_{PRE}(ID) + S'^{*}\sin\theta_{PRE}(ID) \quad \text{[Equation 7]};$$

$$\Delta(OD) = \delta'^{*}\cos\theta_{PRE}(OD) + S'^{*}\sin\theta_{PRE}(OD) \quad \text{[Equation 8]}.$$

With $\delta'$ and S' computed, a head element offset $\Delta(m)$ can be measured at any radial position of the head 118 when the actuator arm 114 is in between the ID limit stop and the OD limit stop. $\Delta(m)$ represents the head element offset when the head 118 is over the disc 108 at a radial position m. Then the skew angle $\theta'(m)$ can be determined based on the following Equation 9, since $\delta'$ and S' are already determined above:

$$\Delta(m) = \delta'^{*}\cos\theta'(m) + S'^{*}\sin\theta'(m) \quad \text{[Equation 9]}.$$

With introduction of the common-mode error of $\epsilon$:

$$\theta_{ACT}(ID) = \theta_{PRE}(ID) + \epsilon \quad \text{[Equation 10]; and}$$

$$\theta_{ACT}(OD) = \theta_{PRE}(OD) + \epsilon \quad \text{[Equation 11]}.$$

Then, the actual $\delta_{ACT}$ and $S_{ACT}$ can be computed from the following equations 12 and 13:

$$\Delta(ID) = \delta_{ACT}^{*}\cos[\theta_{PRE}(ID)+\epsilon] + S_{ACT}^{*}\sin[\theta_{PRE}(ID)+\epsilon] \quad \text{[Equation 12]; and}$$

$$\Delta(OD) = \delta_{ACT}^{*}\cos[\theta_{PRE}(OD)+\epsilon] + S_{ACT}^{*}\sin[\theta_{PRE}(OD)+\epsilon] \quad \text{[Equation 13]}.$$

Then the skew angle at point m with the introduction of the common mode error can be proved to be $\theta'(m)+\epsilon$ as shown in the following equations:

$$\Delta(m) = \delta_{ACT}^{*}\cos[\theta'(m)+\epsilon] + S_{ACT}^{*}\sin[\theta'(m)+\epsilon] \quad \text{[Equation 14]; and}$$

$$\Delta(m) = \delta'^{*}\cos\theta'(m) + S'^{*}\sin\theta'(m) \quad \text{[Equation 15]}.$$

Thus, at the same head element offset $\Delta(m)$, the relative skew angle $([\theta'(m)+\epsilon]-[\theta'(OD)+\epsilon])$ equals $\theta'(m)-\theta'(OD)$.

Therefore, there is an one-to-one mapping relationship between the head element offsets at the disc ID and OD, $\Delta(ID)$ and $\Delta(OD)$, and the actual skew angles at the disc ID and OD, $\theta_{ACT}(ID)$ and $\theta_{ACT}(OD)$, (where $\theta_{ACT}(ID) = \theta_{PRE}(ID)+\epsilon$ and $\theta_{ACT}(OD) = \theta_{PRE}(OD)+\epsilon$). And this mapping relationship is equivalent to the mapping relationship between the same head element offsets, $\Delta(ID)$ and $\Delta(OD)$, and the predetermined skew angles, $\theta_{PRE}(ID)$ and $\theta_{PRE}(OD)$. Thus, the predetermined skew angles at the disc ID and OD, $\theta_{PRE}(ID)$ and $\theta_{PRE}(OD)$, can be used to compute $\delta$ and S for Equation 4. Even though the common-mode error, $\epsilon$, is ignored and the predetermined skew angles at the disc ID and OD, $\theta_{PRE}(ID)$ and $\theta_{PRE}(OD)$, are used to compute $\delta$ and S, the head position at point m relative to the disc ID or OD is the same as the those in the actual case.

Alternatively, the base head element offset $\delta$ (308) and the spacing gap S (306) may be determined based on a set of guide tracks written in a number of zones between the disc ID and OD. The self-servowriting electronic control system 152 knows the track number of each written guide track, and a skew angle $\theta$ corresponding to each track number is predetermined during the design of the disc drive 100. Then, a series of head element offsets $\Delta s$ can be obtained by measuring $\Delta$ at each guide track. A series of equations are developed by applying each pair of measured $\Delta s$ and the predetermined $\theta s$ to Equation 4, and $\delta$ (308) and S (306) can be determined from the equations.

Now referring again to FIG. 7, the control transfers to Operation 610 once $\delta$ (308) and S (306) are determined in Operation 702–712. The self-servowriting electronic control system 152 begins to self-servowrite tracks on the disc and controls the track pitch as the self-servowriting electronic control system 152 self-propagates servo tracks on the disc. The track pitch control in accordance with an embodiment of the present invention is further described with respect to FIGS. 9–12.

Generally, the track pitch control in accordance with an embodiment of the present invention utilizes the one-to-one mapping relationship between the head element offset $\Delta$ (210) and the skew angle $\theta$ (304). More specifically, after self-propagating a predetermined number (or a batch) of tracks on the disc 108, the self-servowriting electronic control system 152 calculates the head element offset on that track, $\Delta(k)$, and determines the corresponding track angle on that track, $\theta(k)$. The difference between the $\theta(k)$ and the $\theta_{PRE}(OD)$ (i.e., $\theta(k)-\theta_{PRE}(OD)$) is then compared with the difference between the $\theta_{PRE}(k)$ and the $\theta_{PRE}(OD)$ (i.e., $\theta_{PRE}(k)-\theta_{PRE}(OD)$) to see whether the error is within the predetermined tolerance. Just as the skew angles at the ID and OD are predetermined (i.e., the $\theta_{PRE}(ID)$ and the $\theta_{PRE}(OD)$, a selected number of tracks on the disc are also predetermined (i.e., the $\theta_{PRE}(k)$). The pitch of each written track is considered to be correct if the error is within a predetermined range.

Alternatively, the self-servowriting electronic control system 152 may determine the predetermined tolerance based on the determined skew angle $\theta(k)$ and the ideal target track number k' that is predetermined in the track mapping table. For example, supposing that the self-servowriting electronic control system 152 reports a hypothetical skew angle $\theta(k)$ of 20 degrees after self-propagating k number of tracks, the self-servowriting electronic control system 152 looks in the track mapping table to determine how many tracks are targeted to be written when the skew angle is 20 degrees. If the track mapping table indicates that k' number of tracks are to be written, k–k' is considered to see whether the error is within the predetermined tolerance.

A track mapping table maintains a record of a set of predetermined skew angles, $\theta_{PRE}(k)$, for a selected number of tracks on the disc 108. TABLE 1 is an example of the track mapping table. k refers to track numbers of the tracks written on the disc (or a zone on the disc).

TABLE 1

| Track Number, k | Predetermined Skew angle, $\theta_{PRE}(k)$ |
|---|---|
| ID | $\theta_{PRE}(ID)$ |
| 0 | $\theta_{PRE}(0)$ |
| 1000 | $\theta_{PRE}(1000)$ |
| 2000 | $\theta_{PRE}(2000)$ |
| . | . |
| . | . |
| . | . |
| N-2000 | $\theta_{PRE}(N-2000)$ |
| N-1000 | $\theta_{PRE}(N-1000)$ |
| N | $\theta_{PRE}(N)$ |
| OD | $\theta_{PRE}(OD)$ |

It is possible that the $\theta(k)$ for any track k on the disc 108 can be computed by the self-servowriting electronic control system 152 rather than referencing a predetermined value $\theta_{PRE}(k)$ from a table such as TABLE 1. TABLE 1 shows that the skew angle for every $1000^{th}$ track is predetermined. Therefore, the self-servowriting electronic control system 152 compares the determined skew angle $\theta(k)$ with the predetermined skew angle $\theta_{PRE}(k)$ obtained from a track mapping table after writing every 1000 tracks.

The skew angle $\theta$ values that are not shown in the track mapping table (TABLE 1) can be determined by interpolating the predetermined skew angle ($\theta_{PRE}$) values in the map. For example, the skew angles for tracks 1–998, 1000–1999, etc. can be determined by interpolating the predetermined skew angles $\theta_{PRE}(0)$, $\theta_{PRE}(1000)$, $\theta_{PRE}(2000)$, etc. since only the skew angle for every $1000^{th}$ track is predetermined in the track mapping table (TABLE 1). This interpolation is necessary if, for example, there are 600 tracks to be written in every zone, and the self-servowriting electronic control system 152 checks for the track pitch after writing tracks in each zone. This requires knowledge of $\theta_{PRE}(0)$, $\theta_{PRE}(600)$, $\theta_{PRE}(1200)$, etc., which are not in the track mapping table (TABLE 1). However, these skew angles can be interpolated based on the predetermined skew angles in the track mapping table (i.e., $\theta_{PRE}(0)$, $\theta_{PRE}(1000)$, $\theta_{PRE}(2000)$ . . . $\theta_{PRE}(N)$) as shown in TABLE 1.

Figure 13:
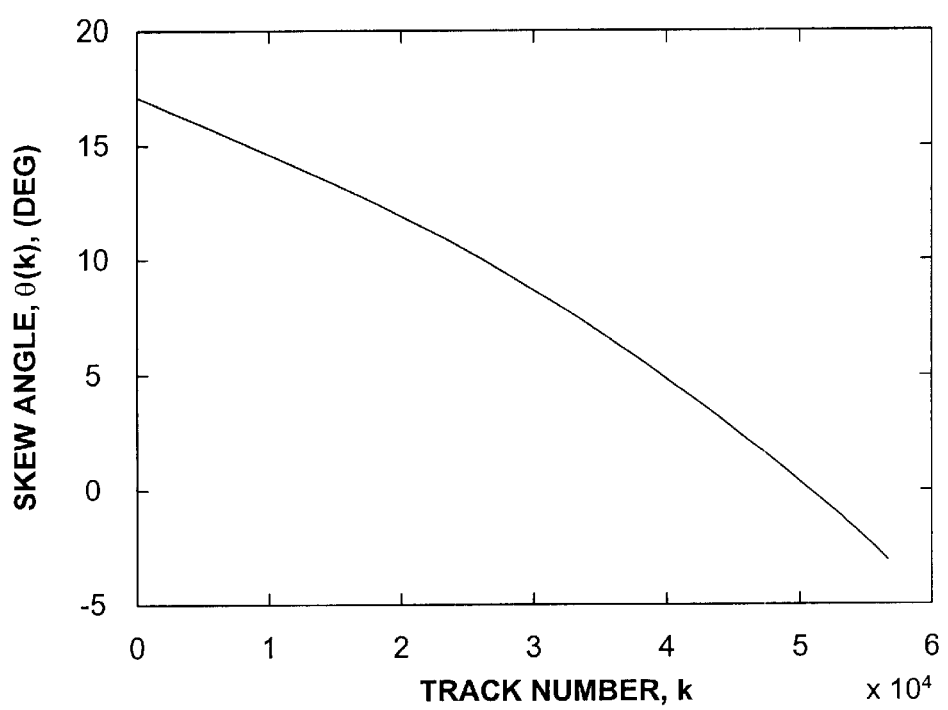
FIG. 13 is graph showing a typical non-linear relationship between the skew angle θ(k) and the track (k).

The relationship between the skew angle $\theta(k)$ and the track k is not linear. A typical non-linear relationship between the skew angle $\theta(k)$ and the track k is shown in FIG. 13. As shown in FIG. 13, the skew angle step sizes (i.e., $\theta(k+1)-\theta(k)$) are not constant. For this reason, a third-order polynomial model is typically used to generate the interpolated skew angles. For example, a series of equations are generated from N points in the track mapping table:

$\theta(0)=a3*(0)^3+a2*(0)^2+a1*(0)+a0$, for track number 0;

$\theta(1000)=a3*(1000)^3+a2*(1000)^2+a1*(1000)+a0$, for track number 1000;

$\theta(2000)=a3*(2000)^3+a2*(2000)^2+a1*(1000)+a0$, for track number 2000; . . .

$\theta(N)=a3*(N)^3+a2*(N)^2+a1*(N)+a0$, for track number N.

The coefficients [a3, a2, a1, a0] are solved by using the least square method. Then, the skew angle $\theta(k)$ for any track k can be accurately estimated based on the coefficients.

As described above, the skew angle $\theta(k)$ was solved by first measuring $\Delta(k)$ and applying it in Equation 4. However, the skew angle $\theta(k)$ may be difficult to be solved by utilizing the controller 142. In other words, solving a skew angle $\theta$ from the equation, $\Delta=S*\sin\theta+\delta*\cos\theta$, may be a difficult task for the controller 142. On the other hand, computing $\Delta$ is a relatively simple task for the controller 142. To avoid utilizing the controller 142 to solve $\theta(k)$, an embodiment of the present invention can utilize an alternate approach for controlling track pitch that is based on measured $\Delta(k)$. This alternate approach is described below with respect to FIG. 11.

After writing the track k, the head element offset on that track, $\Delta_{MEA}(k)$, can be measured. Based on the measured $\Delta_{MEA}(k)$, a corresponding skew angle $\theta(k)$ can be determined from the track mapping table such as that shown in TABLE 1 or by interpolating using [a0, a1, a2, a3] coefficients if the skew angle for the track k is not already predetermined in the track mapping table. Then a desired head element offset on the track k, $\Delta_{DES}(k)$, can be computed from Equation 4:

$$\Delta_{DES}(k)=S*\sin\theta(k)+\delta*\cos\theta(k)$$

The desired head element offset $\Delta_{DES}(k)$ is then compared with the measured head element offset $\Delta_{CALC}(k)$. The difference between $\Delta_{DES}$ and $\Delta_{CALC}$ is utilized to determine the track pitch correction factor that is then utilized for compensating the track pitch.

For example, after writing 1000 tracks, $\Delta_{MEA}(1000)$ can be measured and calculated. Then, the skew angle at the track number 1000, $\theta_{PRE}(1000)$ can be obtained from the track mapping table (TABLE 1) since the skew angles are predetermined for every one thousand track. On the other hand, a skew angle for a track that is not predetermined in the track mapping table (TABLE 1) can be obtained by interpolation (e.g., $\theta(890)$ can be interpolated utilizing [a3, a2, a1, a0] coefficients). A desired head element offset at the track 1000, $\Delta_{DES}(1000)$, can be computed from Equation 4 such that:

$$\Delta_{DES}(1000)=S*\sin\theta_{PRE}(1000)+\delta*\cos\theta_{PRE}(1000).$$

The desired head element offset $\Delta_{DES}(1000)$ is then compared with the measured head element offset $\Delta_{MEA}(1000)$. The difference between $\Delta_{DES}$ and $\Delta_{MEA}$ is utilized for compensating the track pitch.

Figure 9:
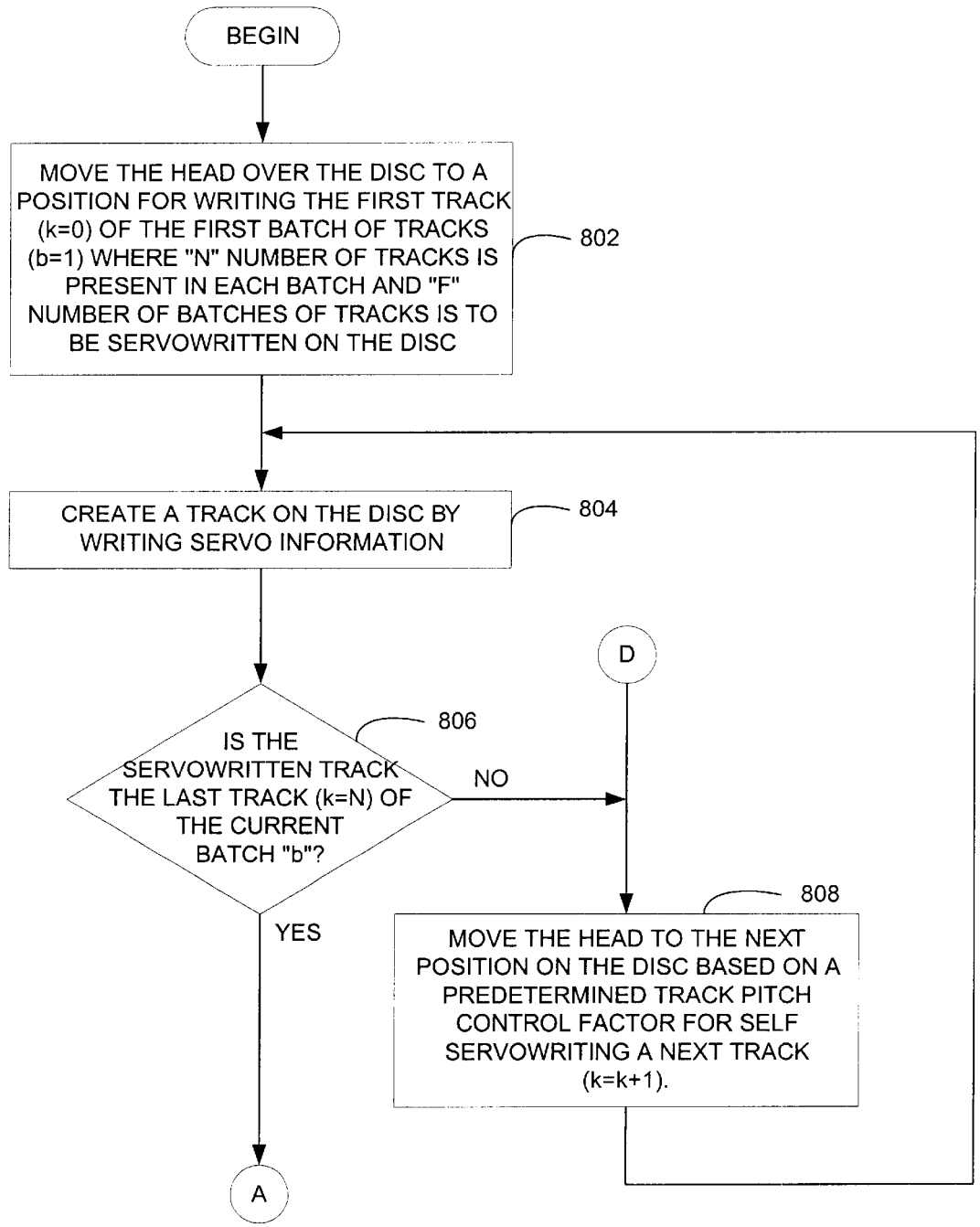
FIGS. 9–12 together comprise a flowchart showing operations for controlling pitch during a self-servowriting process.

Now referring to FIG. 9, the control begins in Operation 802. The self-servowriting electronic control system 152 moves the head 118 to a radial position on the disc 108 to write a first servo track that is contiguously adjacent the prewritten guide tracks. The guide tracks G1–G6 shown in FIG. 4 provide AB servoburst guide patterns, and the self-servowriting electronic control system 152 can position the read element 202 on a desired radial position over the guide patterns. The self-servowriting electronic control system 152 therefore positions read element 202 at the boundary of the guide tracks G2 and G3 (since the maximum head element offset $\Delta$ (210) in an embodiment of the present invention is 4.5 track widths when the read element 202 is following the boundary of the guide tracks G2 and G3) and follows the boundary so that the write element 204 is flying over the disc radial position that corresponds to the first servo track (k=0) that is to be self-servowritten. The Operation 804 assumes control once the read element 202 is following the boundary between the two guide tracks G2 and G3, and the self-servowriting electronic control system 152 writes A servo bursts on the track k=0.

Query Operation 806 assumes control after each track is written by the self-servowriting electronic control system 152 in Operation 804. Operation 806 checks to see whether a predetermined number (or a batch) of tracks are written on the disc 108. The control transfers to Operation 808 if the self-servowriting electronic control system 152 determines in Query Operation 806 that a predetermined number of tracks are not written. Operation 808 displaces the actuator assembly 114 until the read element 202 is flying over the guide pattern such that the write element 204 is positioned at a radial position determined by the self-servowriting electronic control system 152. After writing A servo bursts on the track k=0, the read element 202 positions itself over the boundary of tracks G3 and G4 so that the write element 204 would be in a correct position to write B servo bursts on the track k=1.

When the read element 202 reaches the end of the guide servo burst patterns (i.e., the track G6), the read element 202 follows the self-servowritten tracks (k=0, 1, 2, 3, etc.) where the track k=0 is adjacent the last guide track G6. Operation 808 transfers control to Operation 804 to write the servo track. The Operations 804–808 continues and writes a series of servo tracks until the predetermined number (or a batch) of servo tracks are written on the disc. In this manner, the self-servowriting electronic system self-propagates tracks without help from an external servowriter, and the self-servowriting process continues until the desired number of servo tracks is written.

The step size for positioning the read element 202 in order to propagate servo tracks is set by a track pitch control factor. This track pitch control factor is initially predetermined in the self-servowriting electronic control system 152. In an embodiment of the present invention, the ECHO servowriting technique utilized to self-servowrite tracks on the disc 108, and the step size for positioning the read element 202 is based on the guide servo patterns according to the ECHO servowriting technique. For this reason, the read element 202 follows one boundary of A and B servo burst patterns as the read element 204 is writing servo bursts creating a new servo track, and once the servo track is written, the read element 202 moves over to the adjacent servo track until it locates the next boundary of A and B servo bursts. Thus, the track pitch control factor can be adjusted to refine the step size of the read element 202 following the guide servo patterns and can thereby control the track pitch so that the movement of the head 118 is in proportion to the pitch of a guide track.

Nevertheless, the track pitch control factor determined in an embodiment of the present invention is not dependent on what kind of self-servowriting technique was utilized to servowrite tracks on the disc 108. Other types of conventional self-servowriters do not utilize guide tracks. They typically control the track pitch based on the write element width or based on the servo burst amplitude read from the previously written track. For example, the self-servowriting technique disclosed in Oliver et al. uses a predetermined reduction number or percentage of amplitude reduction X% as a step size to self propagate servo tracks on a disc. The first reference is written and read with the moving head. The moving head is then displaced away until the amplitude of the first reference track is reduced to X% of its original amplitude. A second reference track is then written with the moving head, and the moving head is then displaced again in the same direction until the amplitude of the second reference track is reduced to X% of its original value. The process is continued, writing successive reference tracks and displacing the moving head by an amount sufficient to reduce the amplitude to X% of its original value. If the Oliver et al. technique (instead of the ECHO technique) were used to servowrite tracks on the disc, the track pitch control factor determined in an embodiment of the present invention would then calibrate the size of the amplitude reduction.

Figure 10:
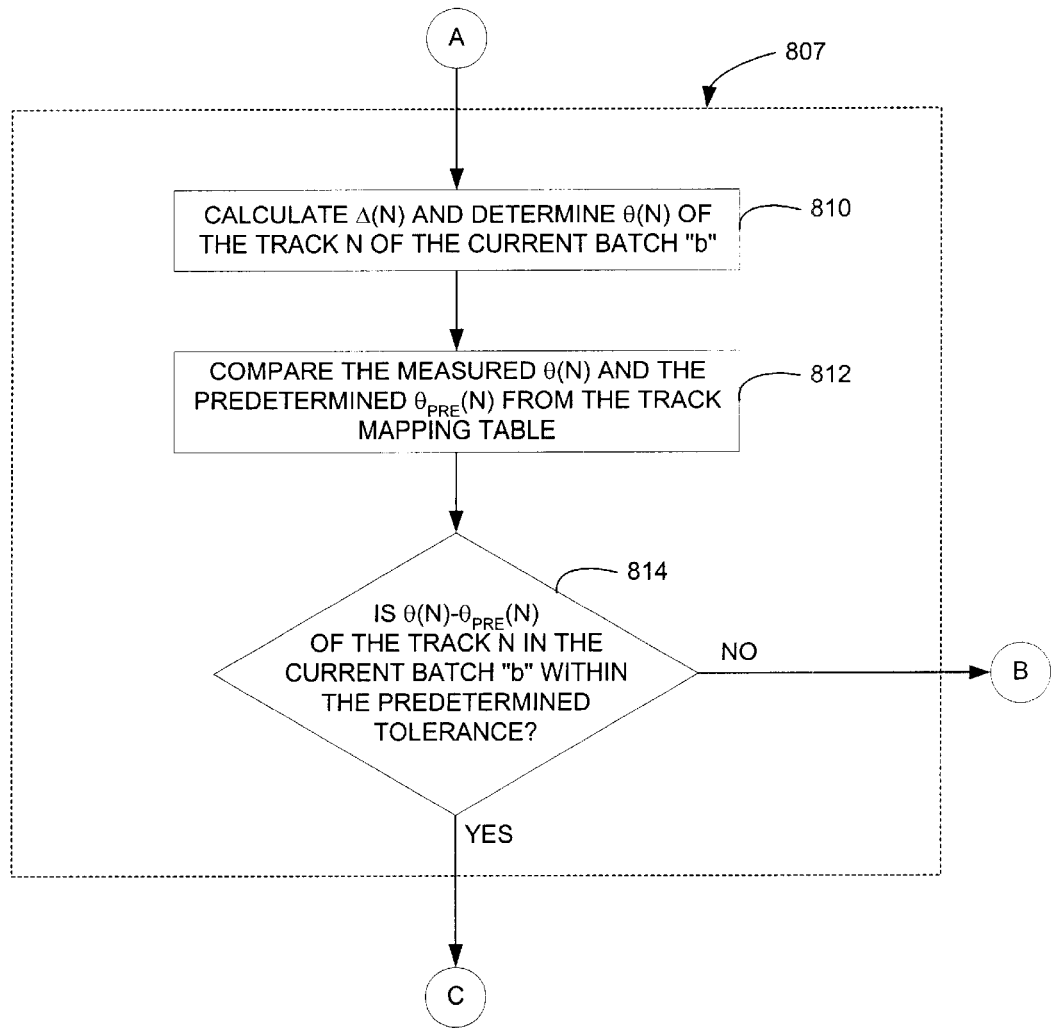
Figure 11:
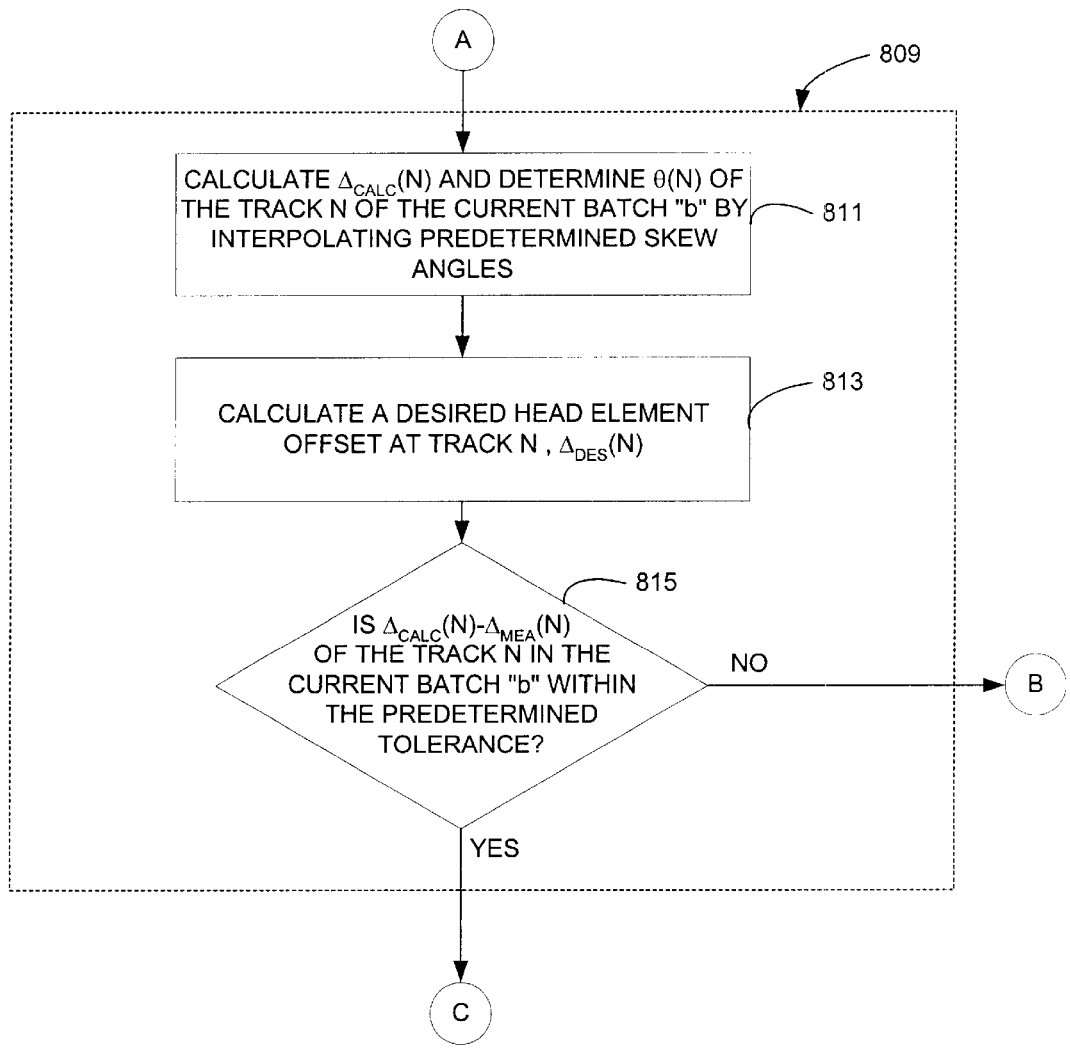

Operations 806 transfers control to either a set of Operations collectively referred to as 807 and shown in FIG. 10 or alternatively another set of Operations collectively referred to as 809 and shown in FIG. 11 if all of the predetermined number (or a batch) of tracks are written on the disc. For example, according to the track mapping table (TABLE 1), the skew angle for every $1000^{th}$ track is predetermined. For this reason, there are 1000 tracks in a batch (i.e., N=1000), and the self-servowriting electronic control system 152 self-propagates 1000 servo tracks in an embodiment of the invention before Operations 807 (FIG. 10) or Operations 809 (FIG. 11) assume control. An embodiment of the present invention can utilize either set of Operations (807 or 809) to achieve the same results although the set of Operations 809 (FIG. 11) is a preferred method.

The set of Operations 807 (FIG. 10) comprising Operations 810, 812, and 814 are discussed first. Then the discussion related to the set of Operations 809 (FIG. 11) comprising Operations 811, 813, and 815 follows thereafter. In Operation 810, the self-servowriting electronic control system 152 calculates the head element offset after writing the last track in the batch, $\Delta(N)$. The technique of calculating the head element offset $\Delta$ (210) is already described above and is not discussed here. The skew angle of the last track in the batch, $\theta(N)$, can be determined by using the Equation 4 with the base head element offset $\delta$ (308) and the spacing gap S (306) already determined during the calibration stage (shown in FIG. 8).

Operation 812 assumes control once the skew angle $\theta(N)$ is determined. The self-servowriting electronic control system 152 then compares the $\theta(N)$ with the predetermined skew angle $\theta_{PRE}(N)$ in the track mapping table (TABLE 1). Query Operation 814 assumes control if the difference between $\theta(N)$ and $\theta_{PRE}(N)$ is determined. If the difference between $\theta(N)$ and $\theta_{PRE}(N)$ is not within a predetermined tolerance, control transfers to Operation 818 in FIG. 12. Control, however, transfers to Operation 816 in FIG. 12 if the difference between $\theta(N)$ and $\theta_{PRE}(N)$ is within the predetermined tolerance.

Now referring to FIG. 11, the set of Operations 809 that may be preferably utilized in lieu of the set of Operations 807 is described. In Operation 811, the self-servowriting electronic control system 152 calculates the head element offset after writing the last track in the batch, $\Delta_{CALC}(N)$. The technique of calculating the head element offset $\Delta$ (210) is already described above and is not discussed here. Then the skew angle of the last track in the batch, $\theta(N)$, is interpolated based on the [a0, a1, a2, a3] coefficients and the predetermined skew angles, $\theta_{PRE}$s, obtained from the track mapping table. This is different from the technique disclosed in the set of Operations 807 above where the $\theta(N)$ was computed by using the Equation 4 with the base head element offset $\delta$ (308) and the spacing gap S (306) already determined during the calibration stage (shown in FIG. 8).

The control then transfers to Operation 813 once the $\Delta_{CALC}(N)$ and the $\theta(N)$ are computed. In Operation 813, the desired skew angle on the track N is then calculated from Equation 4:

$$\Delta_{DES}(N) = S^* \sin \theta(N) + \delta^* \cos \theta(N).$$

Control transfers to Query Operation 815, in which operation the desired head element offset $\Delta_{DES}(N)$ is then compared with the measured head element offset $\Delta_{CALC}(N)$. The difference between $\Delta_{DES}$ and $\Delta_{CALC}$ is utilized to determine the track pitch correction factor that is then utilized for compensating the track pitch. In Query Operation 815, the self-servowriting electronic control system 152 compares the $\Delta_{CALC}(N)$ with the $\Delta_{MEA}(N)$. If the difference between $\Delta_{CALC}(N)$ and the $\Delta_{MEA}(N)$ is not within a predetermined tolerance, control transfers to Operation 818 in FIG. 12.

Figure 12:
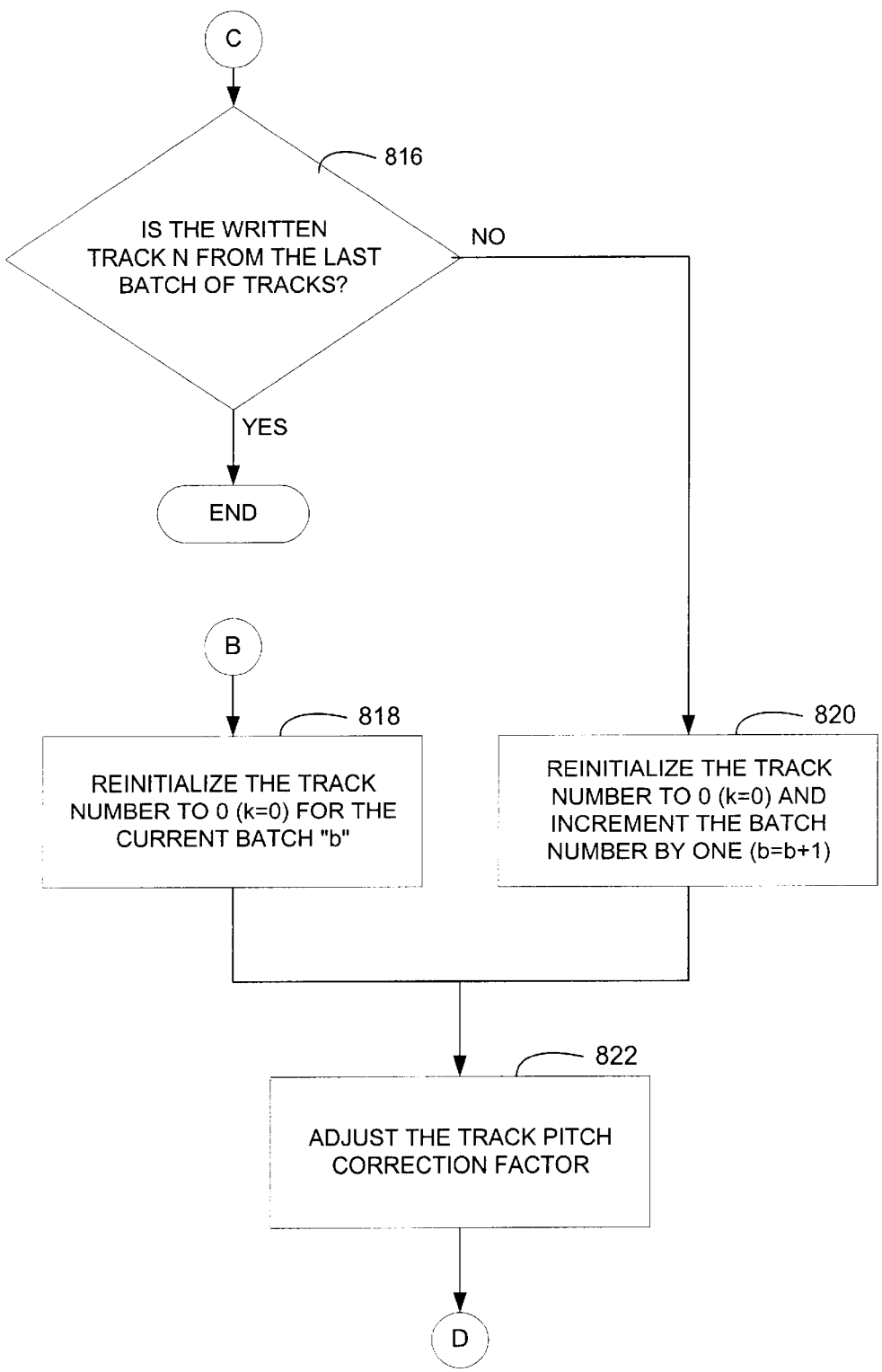

Control, however, transfers to Operation 816 in FIG. 12 if the difference between $\Delta_{CALC}(N)$ and the $\Delta_{MEA}(N)$ is within the predetermined tolerance.

The predetermined tolerance indicates whether the amount of space the written tracks in a batch occupying a portion of the disc surface area is within an acceptable tolerance such that the remaining portion of the disc surface area is sufficiently large to accommodate the self-servowriting electronic control system 152 to continue writing all tracks remaining in the subsequent batches. For example, suppose that the track mapping table indicates that the skew angle for each track to be written should be 1 degree more than the skew angle of the previous written track in order to maintain a desired track density (i.e., $\theta_{PRE}(0)=0$, $\theta_{PRE}(1)=1$, $\theta_{PRE}(2)=2$, $\theta_{PRE}(3)=3$, $\theta_{PRE}(4)=4$, $\theta_{PRE}(5)=5$, etc.) However, it was determined that the skew angle at the fifth track was 6 degrees (i.e., $\theta(5)=6$). Then, the skew angle error at the fifth track, $\theta(5)-\theta_{DES}(5)$, is computed to be 1 degree. In Operation 814, it is determined whether or not that the 1-degree skew angle error is within the predetermined tolerance. That is, whether or not that 1-degree error already written in the N number of tracks can be made up during the servowriting of the subsequent batches of tracks and obtain the desire track pitch or density.

If, for example, the predetermined tolerance was 0.7 to 1.2 degrees, then the 1-degree skew angle error is within the predetermined tolerance, and this error can be made up by controlling the track pitch of the subsequent batches of tracks. In this manner, a desired track density (i.e., tracks-per-inch, TPI) is maintained as the self-servowriting electronic control system 152 self-propagates servo tracks on the disc 108. If, however, the skew angle error at the fifth track, $\theta(5)-\theta_{DES}(5)$, is computed to be 0.5 degree, this error is not within the predetermined tolerance of 0.7 to 1.2 degrees, and this error cannot be made up by controlling the track pitch of the subsequent batch of tracks. The self-servowriting electronic control system rewrites the tracks (e.g., k=0 to 5) with the corrected track pitch control factor and thus maintains the desired track density.

In a conventional self-servowriting technique, predicting the total number of tracks that can be propagated on the entire disc surface is a very difficult process until the entire disc is servowritten. This is because typically the pitch of a self-servowritten track cannot be determined unless there is a prewritten measure that can be compared to the width of the track being self-servowritten. Such a prewritten measure is usually created by an external servowriter. Thus, in a self-servowriting system that does not utilize a prewritten measure, the track density cannot be accurately determined until all tracks are written on the disc. If the total number of tracks written on the disc is far off from the desired number of tracks to be written on the disc that is required to maintain a desired track density, the entire disc may need to be erased and the self-servowriting process repeated with a corrected track pitch.

An embodiment of the present invention is more advantageous than a conventional self-servowriting technique since it performs on-the-fly checking and verification of the track density based on the calculated head element offset $\Delta(k)$ and the skew angle $\theta(k)$ determined based on $\Delta(k)$ without requiring an external servowriter. Generally, the track pitch control in accordance with an embodiment of the present invention utilizes the one-to-one mapping relationship between the head element offset $\Delta$ (210) and the skew angle $\theta$ (304). After self-propagating a predetermined number (or a batch) of tracks on the disc 108, the self-servowriting electronic control system 152 calculates the head element offset on that track, $\Delta(k)$, and determines the corresponding track angle on that track, $\theta(k)$. The determined skew angle $\theta(k)$ is then compared with a predetermined skew angle value on that track, $\theta_{PRE}(k)$ to see whether the difference between $\theta(k)$ and $\theta_{PRE}(k)$ is within a predetermined tolerance. The pitch of the written tracks are considered to be correct if the difference between $\theta(k)$ and $\theta_{PRE}(k)$ is within the predetermined tolerance.

Now referring to FIG. 12, the self-servowriting electronic control system 152 reinitializes the track number to 0 (k=0) in Operation 818, in order to rewrite the tracks in the current batch b. For example, if the 1-degree skew angle error of the previous example at the fifth track is determined to be not within the predetermined tolerance, Operation 818 rewrites the previously written tracks (e.g., tracks 0–5) with a new track pitch correction factor determined and applied. Control then transfers to Operation 822. In Operation 822, the track pitch correction factor is adjusted in order to rewrite the tracks in the current batch within the predetermined skew angle $\theta_{PRE}(N)$. Then the control transfers back to Operation 808 from Operation 822, and the self-servowriting repeats to rewrite the predetermined number of tracks of the batch.

On the other hand, control transfers to Operation 816 in FIG. 10 if Query Operation 814 determines that the difference between $\theta(N)$ and $\theta_{PRE}(N)$ is within the predetermined tolerance. In Operation 816, the self-servowriting electronic control system 152 checks whether all tracks in the last batch is written on the disc 108. The control ends, if Query Operation 816 determines that all tracks of every batch are written on the disc 108.

Operation 820 (FIG. 12) assumes control from Operation 816 if the servowritten tracks are not from the last batch. Operation 820 reinitializes the track number to 0 and increments the batch number by 1 in order to continue writing the next batch of tracks. Control transfers to Operation 822, and the self-servowriting electronic control system 152 adjusts the track pitch correction factor, which is to be applied to the tracks to be written in the next batch. If the written track is within the predetermined tolerance and is not the last track of the last batch, track pitch correction factors for subsequent tracks that are to be written are determined based on the difference between the obtained $\theta(N)$ and $\theta_{PRE}(N)$ from the track mapping table. To illustrate, it was determined in the previous example that the +1 degree skew angle error found at the fifth written track was within the predetermined tolerance. Therefore, for the subsequent tracks to be written (e.g., sixth, seventh, etc. tracks), the track pitch correction factor contains the information for reducing the track pitch for the subsequent tracks.

Then the control transfers back to Operation 808 from Operation 822, and the self-servowriting repeats to write the predetermined number of tracks of the next batch. With the track pitch correction factor computed, the head moves to the radial position on the disc for servowriting the track of the next batch in Operation 808.

In summary, the present invention may be viewed as method of controlling pitch of a servowritten track on a disc (such as 108) in a disc drive (such as 100). The disc drive has a head (such as 118), for traversing over a surface of the disc, that has a read element (such as 202) and a write element (such as 204) separated by a head element offset $\Delta$ (such as 210).

A servowriting controller (such as 152) is operably connected to the disc drive (such as 100) and servowrites a track k (such as FIG. 4 and Operations 802, 804, 806, and 808). The servowriting controller calculates the head element offset $\Delta$ on the track k, $[\Delta_{CALC}(k)]$ and determines a skew angle θ of the track k, [θ(k)] (such as Operations 810 and 811). The servowriting controller then adjusts a track pitch correction factor based on the $\Delta_{CALC}$(K) and the θ(k) (such as Operations 807, 809, 816, 818, 820, and 822) such that the track pitch correction factor is utilized to servowrite a next track (such as Operations 818 and 820).

In an embodiment of the present invention, the θ(k) is determined based on a mathematical relationship, $\Delta_{CALC}$(k)=S*sin θ(k)+δ*cos θ(k) (such as Equation 4), wherein S is a spacing gap between the read element (such as 306) and the write element and δ is a base head element offset (such as 308). The track pitch correction factor is then adjusted based on a comparison between the θ(k) and a predetermined skew angle $θ_{PRE}$ of the track k, [$θ_{PRE}$(k)] (such as Operations 810, 812, and 814). A plurality of predetermined skew angles $θ_{PRE}$s for a plurality of tracks, including the $θ_{PRE}$(k), is stored in a track mapping table (such as TABLE 1).

The servowriting controller determines whether a difference between the θ(k) and the $θ_{PRE}$(k) is within a predetermined tolerance (such as Operation 814). A desired track density is maintained on the disc if the difference between the θ(k) and the $θ_{PRE}$(k) is within the predetermined tolerance.

The servowriting controller may adjust the track pitch control factor for re-servowriting the track k if the difference between the θ(k) and the $θ_{PRE}$ (k) is not within the predetermined tolerance (such as Operations 807, 818, and 822) and re-servowrites the track k utilizing the adjusted track pitch control factor such that the difference between the θ(k) and the $θ_{PRE}$(k) is within the predetermined tolerance (such as Operations 804, 806, and 808). Alternatively, the servowriting controller adjusting the track pitch control factor for servowriting a new track (k+1) if the difference between the θ(k) and the $θ_{PRE}$(k) is within the predetermined tolerance (such as Operations 807, 820, and 822) such that a desired track density is maintain on the disc, and servowrites the new track (k+1), preferably adjacent the track k, utilizing the adjusted track pitch control factor (such as Operations 804, 806, and 808) such that the difference between the skew angle of the new track θ(k+1) and the predetermined skew angle of the new track $θ_{PRE}$(k+1) is within the predetermined tolerance.

In an alternate embodiment of the present invention, the θ(k), is interpolated based on at least two predetermined skew angles, $θ_{PRE}$s (such as Operation 811). A plurality of $θ_{PRE}$s for a plurality of tracks is stored in a track mapping table (such as TABLE 1). A desired head element offset $\Delta_{DES}$ for the track k, [$\Delta_{DES}$(k)], is determined based on a mathematical relationship, $\Delta_{DES}$(k)=S*sin θ(k)+δ*cos θ(k) (such as Equation 4). S is a spacing gap between the read element and the write element (such as 306) and δ is a base head element offset (such as 308).

The servowriting controller (such as 152) determines whether a difference between the $\Delta_{CALC}$(k) and the $\Delta_{DES}$(k) is within a predetermined tolerance (such as Operation 811, 813, and 815). A desired track density is maintained on the disc if the difference between the $\Delta_{CALC}$(k) and the $\Delta_{DES}$(k) is within the predetermined tolerance.

The servowriting controller adjusts the track pitch control factor for re-servowriting a previously servowritten track if the difference between the $\Delta_{CALC}$(k) and the $\Delta_{DES}$(k) is not within the predetermined tolerance (such as Operations 809, 818, and 822), and re-servowrites the track k utilizing the adjusted track pitch control factor such that the difference between the $\Delta_{CALC}$(k) and the $\Delta_{DES}$(K) is within the predetermined tolerance (such as Operations 804, 806, and 808).

Alternatively, the servowriting controller adjusts the track pitch control factor for servowriting a new track (k+1) if the difference between the $\Delta_{CALC}$(k) and the $\Delta_{DES}$(k) is within the predetermined tolerance such that a desired track density is maintain on the disc (such as Operations 809, 820, and 822), and servowrites the new track (k+1), preferably adjacent the track k, utilizing the adjusted track pitch control factor (such as Operations 804, 806, and 808) such that the difference between the calculated head element offset $\Delta_{CALC}$ of the new track (k+1), [$\Delta_{CALC}$(k+1)], and the desired head element offset $\Delta_{DES}$ of the new track (k+1), [$\Delta_{DES}$(k+1)], is within the predetermined tolerance (such as Operation 811, 813, and 815).

It will be clear that the present invention is well adapted to attain the ends and advantages mentioned as well as those inherent therein. While a presently preferred embodiment has been described for purposes of this disclosure, various changes and modifications may be made which are well within the scope of the present invention. Numerous other changes may be made which will readily suggest themselves to those skilled in the art and which are encompassed in the spirit of the invention disclosed and as defined in the appended claims.

What is claimed is:

1. A method of controlling a track pitch on a disc in a disc drive, wherein the disc drive has a head for traversing over a surface of the disc, the method comprising steps of:
 (a) servowriting a track k;
 (b) calculating a head element offset Δ separating a read element and a write element of the head at the track k, [$\Delta_{CALC}$(k)];
 (c) determining a skew angle θ at the track k, [θ(k)]; and
 (d) adjusting a track pitch correction factor based on the $\Delta_{CALC}$(k) and the θ(k), wherein the track pitch correction factor is utilized to position the head for servowriting a next track.

2. The method of controlling pitch of a track according to claim 1, wherein the θ(k) is determined based on a mathematical relationship, $\Delta_{CALC}$(k)=S*sin θ(k)+δ*cos θ(k), wherein S is a spacing gap between the read element and the write element and δ is a base head element offset.

3. The method of controlling pitch of a track according to claim 2, wherein the track pitch correction factor is adjusted based on a comparison between the θ(k) and a predetermined skew angle $θ_{PRE}$ of the track k, [$θ_{PRE}$(k)].

4. The method of controlling pitch of a track according to claim 3, wherein a plurality of predetermined skew angles $θ_{PRE}$s for a plurality of tracks, including the $θ_{PRE}$(k), is stored in a track mapping table.

5. The method of controlling pitch of a track according to claim 4, wherein the adjusting step (d) comprises a step of:
 (d)(i) determining whether a difference between the θ(k) and the $θ_{PRE}$(k) is within a predetermined tolerance, wherein a desired track density is maintained on the disc if the difference between the θ(k) and the $θ_{PRE}$(k) is within the predetermined tolerance.

6. The method of controlling pitch of a track according to claim 5, wherein the determining step (d)(i) further comprises steps of:
 (d)(i)(1) adjusting the track pitch control factor for re-servowriting the track k if the difference between the θ(k) and the $θ_{PRE}$(k) is not within the predetermined tolerance; and
 (d)(i)(2) re-servowriting the track k utilizing an adjusted track pitch control factor such that the difference between the θ(k) and the $θ_{PRE}$(k) is within the predetermined tolerance.

7. The method of controlling pitch of a track according to claim 5, wherein the determining step (d)(i) further comprises steps of:

(d)(i)(3) adjusting the track pitch control factor for servowriting a new track (k+1) if the difference between the θ(k) and the θ$_{PRE}$(k) is within the predetermined tolerance such that a desired track density is maintain on the disc; and (d)(i)(4) servowriting the new track (k+1) utilizing the adjusted track pitch control factor such that the difference between the skew angle of the new track θ(k+1) and the predetermined skew angle of the new track θ$_{PRE}$(k+1) is within the predetermined tolerance.

8. The method of controlling pitch of a track according to claim 1, wherein the θ(k) is interpolated based on at least two predetermined skew angles, θ$_{PRE}$s.

9. The method of controlling pitch of a track according to claim 8, wherein a desired head element offset Δ$_{DES}$ for the track k, [Δ$_{DES}$(k)], is determined based on a mathematical relationship, Δ$_{DES}$(k)=S*sin θ(k)+δ*cos θ(k), wherein S is a spacing gap between the read element and the write element and δ is a base head element offset.

10. The method of controlling pitch of a track according to claim 9, wherein the adjusting step (d) comprises a step of:

(d)(i) determining whether a difference between the Δ$_{CALC}$(k) and the Δ$_{DES}$(k) is within a predetermined tolerance, wherein a desired track density is maintained on the disc if the difference between the Δ$_{CALC}$(k) and the Δ$_{DES}$(k) is within the predetermined tolerance.

11. The method of controlling pitch of a track according to claim 10, wherein the determining step (d)(i) further comprises steps of:

(d)(i)(1) adjusting the track pitch control factor for re-servowriting a previously servowritten track if the difference between the Δ$_{CALC}$(k) and the Δ$_{DES}$(k) is not within the predetermined tolerance; and (d)(i)(2) re-servowriting the track k utilizing the adjusted track pitch control factor such that the difference between the Δ$_{CALC}$(k) and the Δ$_{DES}$(k) is within the predetermined tolerance.

12. The method of controlling pitch of a track according to claim 10, wherein the determining step (d)(i) further comprises steps of:

(d)(i)(3) adjusting the track pitch control factor for servowriting a new track (k+1) if the difference between the Δ$_{CALC}$(k) and the Δ$_{DES}$(k) is within the predetermined tolerance such that a desired track density is maintain on the disc; and (d)(i)(4) servowriting the new track (k+1) utilizing the adjusted track pitch control factor such that the difference between the calculated head element offset Δ$_{CALC}$ of the new track (k+1), [Δ$_{CALC}$(k+1)], and the desired head element offset Δ$_{DES}$ of the new track (k+1), [Δ$_{DES}$(k+1)], is within the predetermined tolerance.

13. An apparatus for controlling pitch of a track on a disc in a disc drive, wherein the disc drive has a head, for traversing over a surface of the disc, that has a read element and a write element separated by a head element offset Δ, the apparatus comprising:

a servowriting controller operably connected to the disc drive operable to servowrite a track k, calculate the head element offset Δ at the track k, [Δ$_{CALC}$(k)], determine a skew angle θ at the track k, [θ(k)], and adjust a track pitch correction factor based on the Δ$_{CALC}$(K) and the θ(k), wherein the track pitch correction factor is utilized to position the head for servowriting a next track.

14. The apparatus of claim 13, wherein the θ(k) is determined based on a mathematical relationship, Δ$_{CALC}$(k)=S*sin θ(k)+δ*cos θ(k), wherein S is a spacing gap between the read element and the write element and δ is a base head element offset.

15. The apparatus of claim 14, wherein the track pitch correction factor is adjusted based on a comparison between the θ(k) and a predetermined skew angle θ$_{PRE}$ of the track k, [θ$_{PRE}$(k)].

16. The apparatus of claim 15, wherein a plurality of predetermined skew angles θ$_{PRE}$s for a plurality of tracks, including the θ$_{PRE}$(k), is stored in a track mapping table.

17. The apparatus of claim 16, wherein the servowriting controller determines whether a difference between the θ(k) and the θ$_{PRE}$(k) is within a predetermined tolerance.

18. The apparatus of claim 17, wherein the servowriting controller adjusts the track pitch control factor if the difference between the θ(k) and the θ$_{PRE}$(k) is not within the predetermined tolerance, and re-servowrites the track k utilizing the adjusted track pitch control factor.

19. The apparatus of claim 18, wherein the servowriting controller adjusts the track pitch control factor for positioning the head to servowrite a new track (k+1) if the difference between the θ(k) and the θ$_{PRE}$(k) is within the predetermined tolerance, and servowrites the new track (k+1) utilizing an adjusted track pitch control factor.

20. The apparatus of claim 13, wherein the θ(k) is interpolated based on at least two predetermined skew angles, θ$_{PRE}$s.

21. The apparatus of claim 20, wherein a desired head element offset Δ$_{DES}$ for the track k, [Δ$_{DES}$(k)], is determined based on a mathematical relationship, Δ$_{DES}$(k)=S*sin θ(k)+δ*cos θ(k), wherein S is a spacing gap between the read element and the write element and δ is a base head element offset.

22. The apparatus of claim 21, wherein the servowriting controller determines whether a difference between the Δ$_{CALC}$(k) and the Δ$_{DES}$(k) is within a predetermined tolerance.

23. The apparatus of claim 22, wherein the servowriting controller adjusts the track pitch control factor for re-servowriting the track k if the difference between the Δ$_{CALC}$(k) and the Δ$_{DES}$(k) is not within the predetermined tolerance, and re-servowrites the track k utilizing the adjusted track pitch control factor.

24. The apparatus of claim 22, wherein the servowriting controller adjusts the track pitch control factor for servowriting a new track (k+1) if the difference between the Δ$_{CALC}$(k) and the Δ$_{DES}$(k) is within the predetermined tolerance, and servowrites the new track (k+1) utilizing the adjusted track pitch control factor.

25. An apparatus for controlling pitch of a track on a disc in a disc drive comprising:

a head in the disc drive for traversing over a surface of the disc, the head having a read element and a write element separated by an head element offset Δ; and means for positioning the head to servowrite a track k that calculates the head element offset Δ at the track k, [Δ$_{CALC}$(k)], determines a skew angle θ at the track k, [θ(k)], and adjusts a track pitch correction factor based on the Δ$_{CALC}$(K) and the θ(k), wherein the track pitch correction factor is utilized to position the head for servowriting a next track.

26. The apparatus of claim 25, wherein the θ(k) is interpolated based on at least two predetermined skew angles, θ$_{PRE}$s.

27. The apparatus of claim 26, wherein a desired head element offset Δ$_{DES}$ for the track k, [Δ$_{DES}$(k)], is determined based on a mathematical relationship, $\Delta_{DES}(k)=S*\sin\theta(k)+\delta*\cos\theta(k)$, wherein S is a spacing gap between the read element and the write element and $\delta$ is a base head element offset.

28. The apparatus of claim 27, wherein the means for positioning the head determines whether a difference between the $\Delta_{CALC}(k)$ and the $\Delta_{DES}(k)$ is within a predetermined tolerance.

29. The apparatus of claim 28, wherein the means for positioning the head adjusts the track pitch control factor for re-servowriting the track k if the difference between the $\Delta_{CALC}(k)$ and the $\Delta_{DES}(k)$ is not within the predetermined tolerance.

30. The apparatus of claim 29, wherein the means for positioning the head adjusts the track pitch control factor for servowriting a new track (k+1) if the difference between the $\Delta_{CALC}(k)$ and the $\Delta_{DES}(k)$ is within the predetermined tolerance.

* * * * *